US008888885B2

(12) United States Patent
Barreteau et al.

(10) Patent No.: US 8,888,885 B2
(45) Date of Patent: Nov. 18, 2014

(54) FILTER AND FILTER MEDIA HAVING REDUCED RESTRICTION

(75) Inventors: Anthony Barreteau, Quimper (FR); Arun Janakiraman, Stoughton, WI (US); Kurt M. A. Badeau, Evansville, WI (US)

(73) Assignee: Cummins Filtration IP Inc., Minneapolis, MN (US)

(*) Notice: Subject to any disclaimer, the term of this patent is extended or adjusted under 35 U.S.C. 154(b) by 331 days.

(21) Appl. No.: 13/412,444

(22) Filed: Mar. 5, 2012

(65) Prior Publication Data

US 2013/0062276 A1 Mar. 14, 2013

Related U.S. Application Data

(63) Continuation-in-part of application No. 13/222,880, filed on Aug. 31, 2011.

(60) Provisional application No. 61/380,407, filed on Sep. 7, 2010.

(51) Int. Cl.
| | |
|---|---|
| *B01D 46/00* | (2006.01) |
| *B01D 46/10* | (2006.01) |
| *B01D 46/24* | (2006.01) |
| *B31D 5/00* | (2006.01) |
| *B01D 46/12* | (2006.01) |
| *B01D 46/52* | (2006.01) |

(52) U.S. Cl.
CPC ............ *B01D 46/0001* (2013.01); *B01D 46/10* (2013.01); *B01D 46/2411* (2013.01); *B31D 5/0082* (2013.01); *B01D 2275/201* (2013.01); *B01D 46/125* (2013.01); *B01D 46/522* (2013.01); *B01D 2275/206* (2013.01); *B01D 46/002* (2013.01); *Y10S 55/05* (2013.01)

USPC ............. 55/521; 55/484; 55/497; 55/DIG. 5; 210/493.1; 210/493.5

(58) Field of Classification Search
USPC ................ 55/484, 497, 521, 498; 210/493.1, 210/493.5
See application file for complete search history.

(56) References Cited

U.S. PATENT DOCUMENTS

| | | | |
|---|---|---|---|
| 3,410,062 A | 11/1968 | Hart | |
| 3,859,068 A | 1/1975 | McLaren et al. | |
| 5,128,039 A | 7/1992 | Gabrielson | |
| 5,558,689 A | 9/1996 | Yanagihara et al. | |
| 5,766,289 A | 6/1998 | Haggard | |

(Continued)

FOREIGN PATENT DOCUMENTS

EP 0 588 922 7/1995

OTHER PUBLICATIONS

International Search Report and Written Opinion mailed Nov. 6, 2012, International Patent Application No. PCT/US2012/054791.

(Continued)

*Primary Examiner* — Robert Clemente
(74) *Attorney, Agent, or Firm* — Foley & Lardner LLP

(57) ABSTRACT

A pleated filter media comprises a plurality of pleats comprised of pleat segments extending in an axial direction between first and second axial ends and extending in a transverse direction that is perpendicular to the axial direction between first and second sets of pleat tips at least partially defined by first and second sets of bend lines. Axial flow channels are defined between the pleat segments in the lateral direction and the plurality of pleats has a width in the transverse direction that varies along the axial direction.

29 Claims, 24 Drawing Sheets

(56) References Cited

U.S. PATENT DOCUMENTS

| | | |
|---|---|---|
| 6,000,685 A | 12/1999 | Groten et al. |
| 6,238,561 B1 | 5/2001 | Liu et al. |
| 6,273,938 B1 | 8/2001 | Fanselow et al. |
| 6,312,489 B1 | 11/2001 | Ernst et al. |
| 6,375,700 B1 | 4/2002 | Jaroszczyk et al. |
| 6,391,076 B1 | 5/2002 | Jaroszczyk et al. |
| 6,416,561 B1 | 7/2002 | Kallsen et al. |
| 6,482,247 B2 | 11/2002 | Jaroszczyk et al. |
| 6,511,599 B2 | 1/2003 | Jaroszczyk et al. |
| 6,544,310 B2 | 4/2003 | Badeau et al. |
| 7,314,558 B1 | 1/2008 | Jaroszczyk et al. |
| 7,323,105 B1 | 1/2008 | Janikowski et al. |
| 7,323,106 B2 | 1/2008 | Jaroszczyk et al. |
| 7,540,895 B2 | 6/2009 | Furseth et al. |
| 7,588,619 B2 | 9/2009 | Chilton et al. |
| 7,648,546 B2 | 1/2010 | Haberkamp et al. |
| 7,799,108 B2 | 9/2010 | Connor et al. |
| 7,879,125 B2 | 2/2011 | Haberkamp et al. |
| 2006/0065592 A1 | 3/2006 | Terres et al. |
| 2006/0107639 A1 | 5/2006 | Hamlin et al. |
| 2006/0272305 A1 | 12/2006 | Morgan |
| 2008/0011673 A1 | 1/2008 | Janikowski et al. |
| 2008/0107765 A1 | 5/2008 | Considine et al. |
| 2011/0186504 A1 | 8/2011 | Rocklitz |

OTHER PUBLICATIONS

International Search Report and Written Opinion for corresponding application PCT/US11/50528, having a mailing date of Jan. 25, 2012.

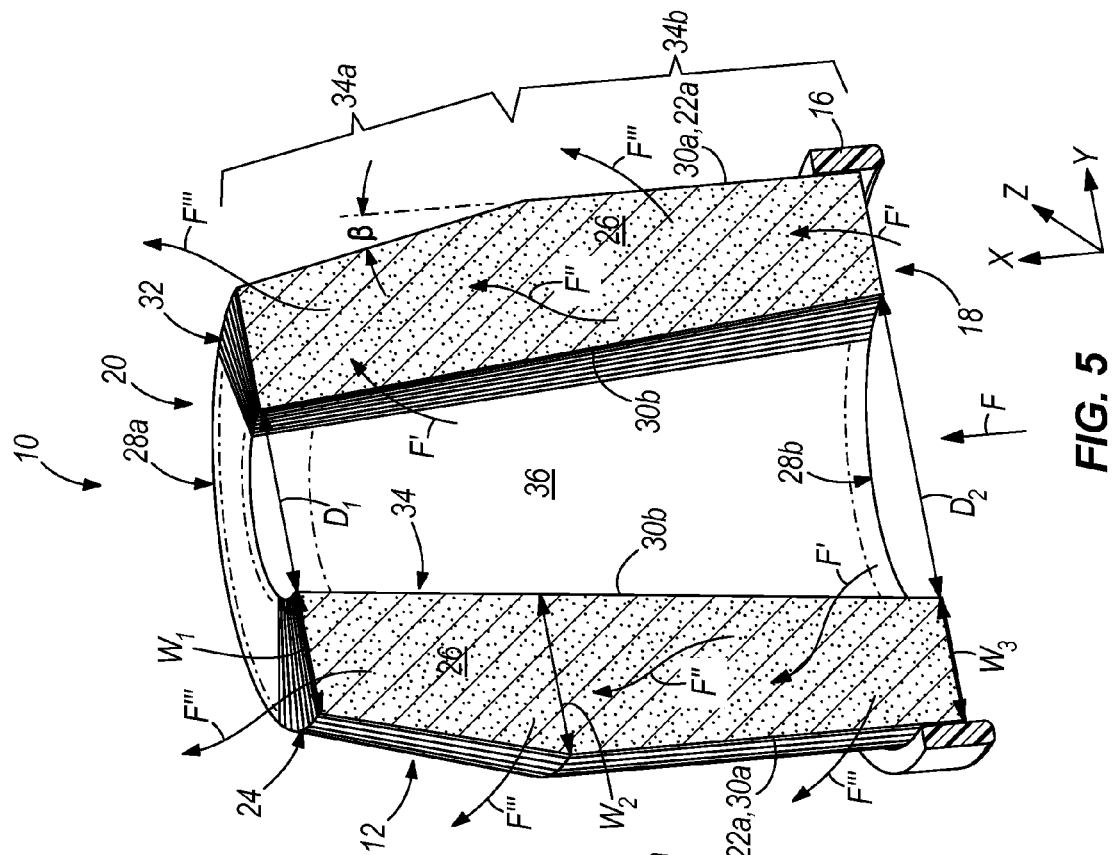

FILTER AND FILTER MEDIA HAVING REDUCED RESTRICTION

CROSS-REFERENCE TO RELATED APPLICATION

The present application is a continuation-in-part of co-pending U.S. patent application Ser. No. 13/222,880, filed Aug. 31, 2011, which is hereby incorporated herein by reference in entirety. The present application also claims the benefit of and priority to U.S. Provisional Patent Application No. 61/380,407, filed Sep. 7, 2010, which is hereby incorporated herein by reference in entirety.

FIELD

The present disclosure relates to filters and filter media for filtering fluid, which can be a liquid or a gas, such as air. Such filters are commonly used for example with internal combustion engines but can be used in various other fluid-filtering applications.

BACKGROUND

U.S. Pat. No. 6,391,076, the disclosure of which is hereby incorporated herein by reference in entirety, discloses a full flow fluid filter having a housing extending axially along an axis, and a pleated filter element having a plurality of pleats in a closed loop annulus having an outer perimeter defined by a plurality of outer pleat tips, an inner perimeter defined by a plurality of inner pleat tips, and a hollow interior extending along the axis. Fluid flows substantially directly axially through the filter element, with minimal bending and change of direction, minimizing flow restriction.

U.S. Patent Publication No. 2006/0065592, the disclosure of which is hereby incorporated herein by reference in entirety, discloses a direct flow filter having seal tips alternately sealing upstream and/or downstream ends of wall segments to each other to define first and second sets of flow channels and protecting the ends of the wall segments from damage, including upstream ends from incoming debris, and providing structural support withstanding high flow rates and improving flow by means of the geometry of the seal.

U.S. Pat. No. 7,314,558, the disclosure of which is hereby incorporated herein by reference in entirety, discloses a pleated panel fluid filter filtering fluid flowing along an axial flow direction and includes angled panels and/or progressively increasing flow channel width and/or skewed panel projections and/or flattened pleat tip bend lines.

U.S. Pat. No. 7,323,106, the disclosure of which is hereby incorporated herein by reference in entirety, discloses a filter with multiple pleated filter elements having axially extending channels having a transverse pleat channel height and a lateral channel width. The pleated filter elements have different channel heights.

U.S. Pat. No. 7,540,895, the disclosure of which is hereby incorporated herein by reference in entirety, discloses a filter including a housing with multiple flow passages and filter elements, including at least first and second flow passages therethrough including respective first and second filter elements in parallel. Respective internal dividing walls separate flow passages in space saving relation.

U.S. Patent Publication No. 2008/0011673, the disclosure of which is hereby incorporated herein by reference in entirety, discloses a direct flow filter having one or more upstream and/or downstream face seals transversely spanning from one set of pleat tips at least partially towards the other set of pleat tips and laterally spanning adjacent channels.

U.S. Pat. No. 7,879,125, the disclosure of which is hereby incorporated herein by reference in entirety, discloses a filter provided by pleated filter media having a plurality of pleats defined by wall segments extending axially along an axial direction along an axis and extending transversely along a transverse direction between first and second sets of pleat tips at first and second sets of axially extending bend lines. The pleated filter media spans laterally along a lateral span along a lateral direction, with the wall segments being spaced from each other by lateral gaps. The pleats have a pleat depth along the transverse direction along the wall segments between the first and second sets of pleat tips. The pleat depth varies as the pleated filter media spans laterally along the lateral direction.

U.S. patent application Ser. No. 13/002,863, filed Jan. 6, 2011, the disclosure of which is hereby incorporated herein by reference in entirety, discloses a filter assembly, panel filter element, and servicing method for reducing inlet flow restriction from a housing inlet into an inlet plenum and reducing outlet flow restriction from an outlet plenum to a housing outlet.

SUMMARY

The present disclosure stems from the inventors' research and development of filters and filter media having reduced restriction.

In one example, a pleated filter media extends in an axial direction, a transverse direction that is perpendicular to the axial direction, and a lateral direction that is perpendicular to the axial direction and perpendicular to the transverse direction. The pleated filter media includes a plurality of pleats comprised of pleat segments extending in the axial direction between first and second axial ends and extending in the transverse direction between first and second sets of pleat tips at least partially defined by first and second sets of bend lines. Axial flow channels are defined between the pleat segments in the lateral direction and the plurality of pleats has a width in the transverse direction that varies along the axial direction.

In another example, a method of forming a filter media comprises: folding a sheet of filter media to form a plurality of pleats comprised of pleat segments extending in the axial direction between first and second axial ends and extending in the transverse direction between first and second sets of pleat tips at least partially defined by first and second sets of bend lines such that axial flow channels are defined between the pleat segments in the lateral direction; and forming the plurality of pleats to have a width in the transverse direction that varies along the axial direction.

In another example, a filter for filtering fluid comprises: a housing retaining a pleated filter media; the pleated filter media comprising a plurality of pleats comprised of pleat segments extending in the axial direction between first and second axial ends and extending in the transverse direction between first and second sets of pleat tips at least partially defined by first and second sets of bend lines; wherein axial flow channels are defined between the pleat segments in the lateral direction and wherein the plurality of pleats has a width in the transverse direction that varies along the axial direction.

In another example, a pleated filter media comprises at least first and second linear portions extending at an angle to the noted axial direction. The first linear portion can extend along the first set of bend lines and the second linear portion can extend along the second set of bend lines. Optionally, the first linear portion can be defined by a first plurality of sunken pleats along the first set of bend lines. The second linear portion can be defined by a second plurality of sunken pleats along the second set of bend lines. Methods of forming such a pleated filter media are also provided.

In a further example, a filter for filtering fluid comprises: a housing retaining a pleated filter media; the pleated filter media comprising pleat segments extending in the axial direction between first and second axial ends and extending in the transverse direction between first and second sets of pleat tips at least partially defined by first and second sets of bend lines. An abutment surface in said housing abuts said pleated filter media along a portion of the plurality of pleats that has a width in the transverse direction that varies along the plurality of pleats.

BRIEF DESCRIPTION OF THE DRAWINGS

FIG. 4 is a cross section of a filter according to a third example of the disclosure wherein a pleated filter media is cylindrical.

FIG. 5 is a cross section of a filter according to a fourth example of the disclosure wherein a portion of a cylindrical pleated filter media has varying width.

DETAILED DESCRIPTION OF THE DRAWINGS

In the present disclosure, certain terms have been used for brevity, clearness and understanding. No unnecessary limitations are to be inferred therefrom beyond the requirement of the prior art because such terms are used for descriptive purposes only and are intended to be broadly construed. The different apparatus and methods described herein may be used alone or in combination with other apparatus and methods. Various equivalents, alternatives and modifications are possible within the scope of the appended claims. Each limitation in the appended claims is intended to invoke interpretation under 35 U.S.C. §112, sixth paragraph only if the terms "means for" or "step for" are explicitly recited in the respective limitation.

Figure 1:
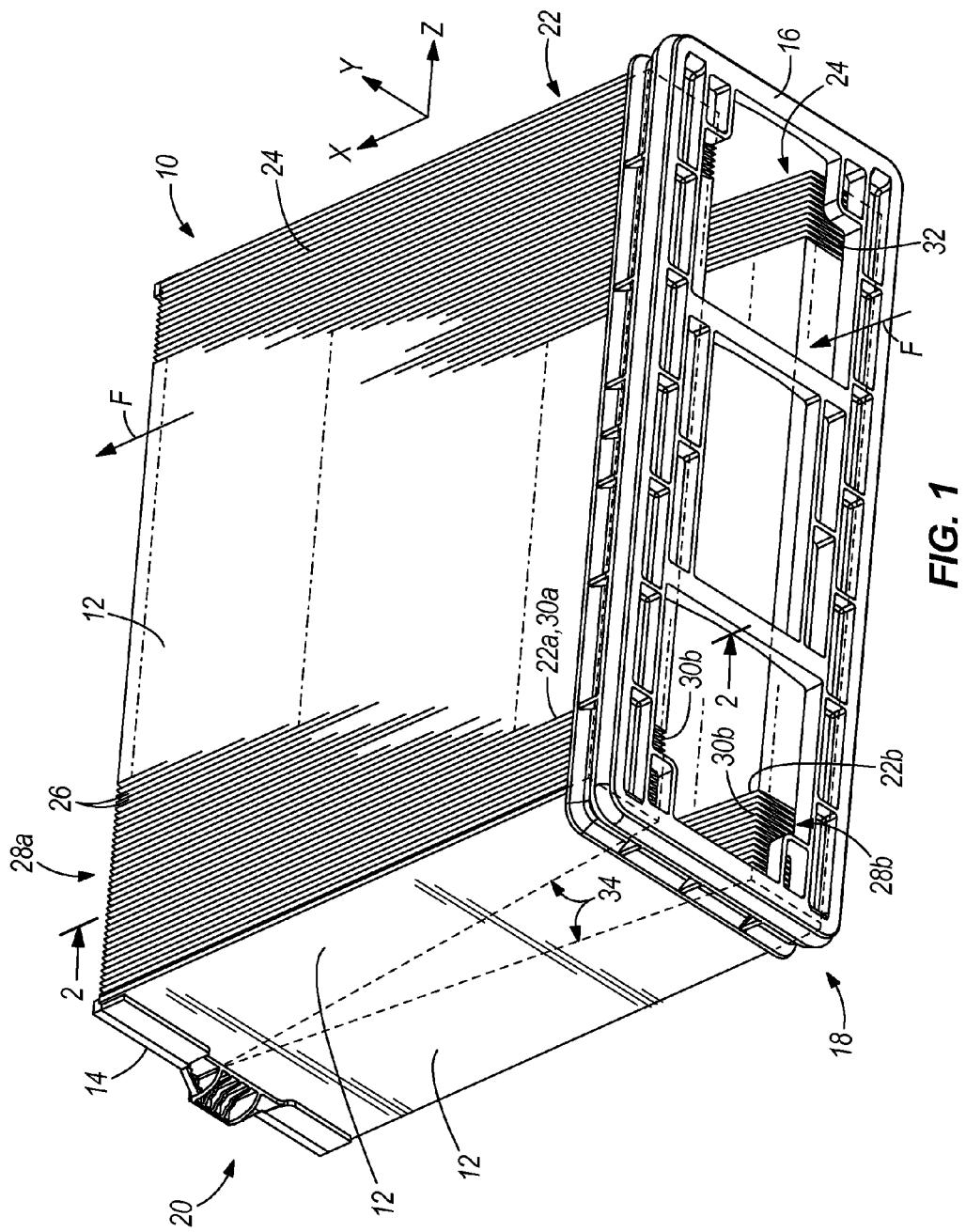
FIG. 1 is a perspective view of a filter according to a first example of the disclosure wherein a pleated filter media has varying width.
Figure 2:
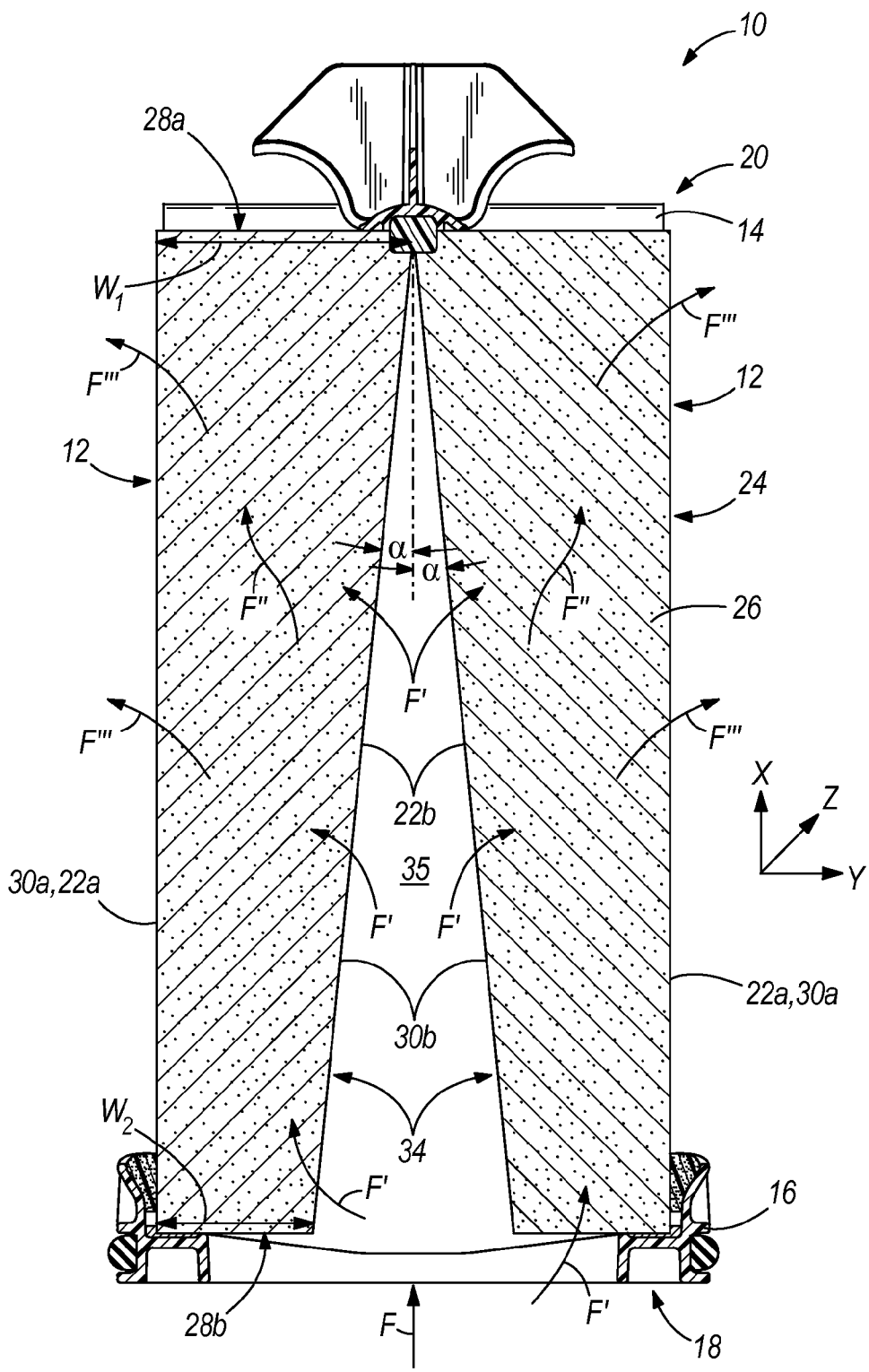
FIG. 2 is an end view of a filter according to the first example of the disclosure.

FIGS. 1 and 2 depict a filter 10 having two pleated filter media 12. The pleated filter media 12 extend in an axial direction x, a transverse direction y that is perpendicular to the axial direction x, and a lateral direction z that is perpendicular to the axial direction x and perpendicular to the transverse direction y. The filter 10 includes end caps 14, 16. Fluid to be filtered flows generally directly axially through the filter 10 from the inlet end 18 to the outlet end 20 as shown by the arrow F. However, the terms "inlet end" and "outlet end" are not intended to be limiting, and fluid may flow in directions other than that described with reference to these Figures, such as oppositely from the end 20 to the end 18.

The pleated filter media 12 is pleated along a plurality of bend lines 22 extending in the axial direction x. The plurality of bend lines 22 comprises a first set of bend lines 22a and a second set of bend lines 22b. The first and second sets of bend lines 22a, 22b partially define a plurality of pleats 24. The pleats 24 are comprised of pleat segments 26 (shown best in FIG. 2) that extend in the axial direction x between first axial ends 28a and second axial ends 28b. The pleat segments 26 also extend in the transverse direction y between a first set of pleat tips 30a and a second set of pleat tips 30b. As further described below, the first and second sets of pleat tips 30a, 30b are at least partially defined by the first and second sets of bend lines 22a, 22b.

The pleat segments 26 define axial flow channels 32 therebetween. (For a more detailed view, see FIG. 16.) In one example, at the inlet end 18, the pleat segments 26 have ends that are alternately sealed to one another to define axial flow channels 32 having open ends at the inlet end 18 and to define axial flow channels 32 having closed ends at the inlet end 18. At the outlet end 20, the pleat segments 26 are oppositely alternately sealed such that if at an inlet end 18, the axial flow channel 32 is closed, it is open at the outlet end 20; and if at the inlet end 18, the axial flow channel 32 is open, it is closed at the outlet end 20. In this way, fluid flows generally axially through the inlet end 18 of the filter 10, through the axial flow channels 32 having open ends at the inlet end 18, crosses laterally (in the z-direction) through the pleat segments 26, and exits through the axial flow channels 32 having open ends at the outlet end 20. Sealing of the plurality of pleat segments 26 is further described in U.S. Pat. No. 7,323,106 and U.S. Pat. No. 7,314,558, both of which are incorporated by reference herein in entirety, and both of which take their description from U.S. Pat. No. 6,482,247, which is also incorporated herein by reference in entirety.

In the example shown in FIG. 2, each of the pleated filter media 12 have a width in the transverse direction y that varies along the axial direction x, such as for example from W1 to W2. More specifically, the first set of bend lines 22a extend in the axial direction. The second set of pleat tips 30b extend at an angle α to the axial direction x in the transverse direction y such that the width of the pleats 24 in the transverse direction y varies along the axial direction x, to define a linear portion 34 of the plurality of pleats 24 extending at an angle to the axial direction. The linear portion 34 can be formed by a plurality of sunken pleats interdigitated amongst the pleat segments 26 in the lateral direction y, as will be described further herein below. The linear portion 34 of the plurality of pleats 24 can also be formed by sets of bonded edges extending at an angle from one of the first and second sets of axially extending bend lines 22a, 22b as is also further described herein below.

FIG. 2 shows two opposing filter media 12 retained by the end caps 14, 16 each filter media 12 comprising the plurality of pleats 24 comprised of pleat segments 26 extending in the axial direction x between first and second axial ends 28a, 28b and extending in the transverse direction y between first and second sets of pleat tips 30a, 30b defined at least partially by first and second sets of bend lines 22a, 22b. Axial flow channels 32 are defined between the pleat segments 26 in the lateral direction z. The plurality of pleats 24 has a width in the transverse direction y that varies along the axial direction x, such as for example from W1 to W2. Further, each opposing filter media 12 comprises a second set of pleat tips 30b extending at an angle α with respect to the axial direction x wherein the first sets of bend lines 22a of each filter media 12 are substantially parallel to the axial direction x such that the opposed filter media 12 define a channel 35 therebetween having a V-shaped cross section along the axial direction x.

Fluid to be filtered flows generally axially in the inlet end 18 as shown by the arrow F. Fluid next flows generally axially into the pleated filter media 12, as shown by the arrows F', through the axial flow channels 32, generally laterally (in the z-direction) through the pleat segments 26 as described above and as shown by the arrows F'', and generally axially out the outlet end 20, as shown by the arrows F'''. If an end cap 14 covers the outlet end 20, fluid may flow generally transversely (in the y direction) to exit the filter media 12.

The V-shaped cross section of the channel 35 increases the flow area between the two filter media 12 as opposed to traditional filters, due to the included angle 2α between the filter media 12. Such a configuration results in a lower expansion loss (or decreased pressure drop) within the filter 10. Because the first sets of bend lines 22a are substantially parallel to the axial direction x, filter 10 with this V-shaped channel 35 is able to utilize the same sized end caps 14, 16 as traditional filters. This means the filter 10 can be integrated into the same housing (not shown) as traditional filters because the dimensions of the filter 10 are the same as those of traditional filters, despite the inclusion of varying pleat depth.

Figure 3:
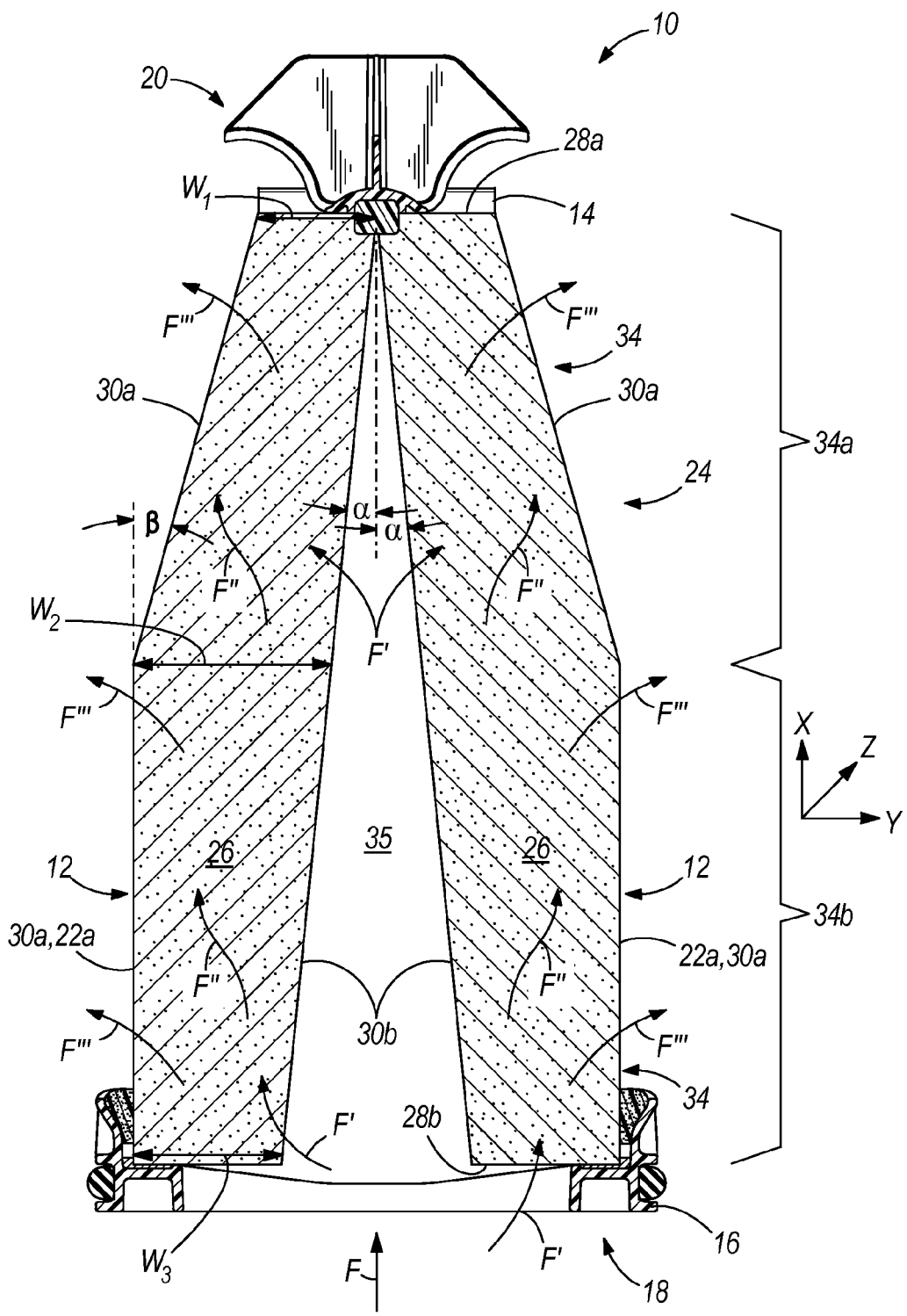
FIG. 3 is an end view of a filter according to a second example of the disclosure wherein at least a portion of a pleated filter media has varying width.

In a third example shown in FIG. 3, the width of the plurality of pleats 24 varies in the transverse direction y at least along a linear portion 34 (here, a first segment 34a, a second segment 34b, and along pleat tips 30b) of the plurality of pleats 24. In this example, as in the example of FIGS. 1 and 2, a second set of pleat tips 30b extends at an angle α from the axial direction x along the entire length of the pleated filter media 12. A first set of pleat tips 30a at a first segment 34b extend at an angle β to the axial direction x. The first set of pleat tips 30a at a second segment 34b extend substantially parallel to the axial direction x. In this example, the pleated filter media 12 comprises a linear portion having first and second segments 34a, 34b that extend at different angles to the axial direction x, respectively. The filter media 12 is one of at least two opposing filter media 12 retained by end caps 14, 16. Each opposing filter media 12 comprises the second set of pleat tips 30b oriented at an angle α with respect to the axial direction x such that the opposing filter media 12 define a channel 35 therebetween having a V-shaped cross section along the axial direction x. For each filter media 12, the first set of pleat tips 30a are oriented at an angle β with respect to the axial direction x at first segment 34a and the first set of pleat tips 30a are substantially parallel to the axial direction x at second segment 34b.

Fluid flows into the filter generally axially in the direction of arrow F. It enters the filter as denoted by the arrows F' then flows through the pleated filter media 12, the pleat segments 26 generally laterally (in the z-direction), and the axial flow channels 32, as described above and shown by the arrows F''. Fluid then exits the filter media 12 generally axially as shown by arrows F'''.

As described above, the V-shaped channel 35 increases the flow area between the two filter media 12 and thus decreases pressure drop. In the same way, the portion 34a of the plurality of pleats 24 provides for decreased pressure drop as fluid exits the pleated filter media 12. Further, if fluid were to flow in a direction substantially opposite to that shown in FIG. 3, fluid entering the pleated filter media 12 at the portion 34a would also experience decreased pressure drop. Finally, such a configuration as shown in FIG. 3 allows the filter 10 to fit into a smaller housing (not shown). In this example and several of the examples that follow, increased open area can be provided at both the inlet and outlet of the filter 10.

FIG. 4 shows a third example of a filter 10 having pleated filter media 12. In this example, the filter media 12 comprises a plurality of pleats 24 having a width that varies in the transverse direction y along the axial direction x. For example, the width of the plurality of pleats 24 varies from W1 to W2. The pleated filter media 12 is cylindrical and defines a central opening 36. The second sets of pleat tips 30b extend at an angle from one another such that the diameter of the central opening 36 increases along the axial direction x from the first axial end 28a to the second axial end 28b of the respective filter media 12. In the example shown, the diameter increases for example from D1 to D2. The central opening 36 is generally V-shaped in cross section along the axial direction x. An end cap 16 is provided at the second axial end 28b, and although not shown here, an end cap 14 can be provided at the first axial end 28a as well.

Fluid to the filter flows generally axially in the direction of arrow F, enters the pleated filter media 12 at the arrows F', flows through the axial flow channels 32 and the plurality of pleat segments 26 generally laterally (in the z-direction) as described above and as shown by the arrows F'', and exits the pleated filter media 12 generally axially as shown by the arrows F'''.

The V-shaped cross section of open area 36 increases the flow area within the cylindrical filter media 12 by making the included angle within the cylindrical filter media 12 bigger than that of traditional cylindrical filter media. This results in decreased pressure drop across the filter such as was described with reference to FIGS. 1-3, and allows use of the same end caps 14 and housing (not shown) as are used for traditional cylindrical filter media.

FIG. 5 shows a cross section of a filter 10 according to a fourth example. In this example, in contrast to the example of FIG. 4, the first set of pleat tips 30a are not substantially parallel to one another along the entire length of the filter media 12. A second set of pleat tips 30b extends at an angle to define a central opening 36 that is substantially V-shaped in cross section along the axial direction x. At a first segment 34a, the first set of pleat tips 30a extends at an angle β to the axial direction x such that the width of the pleats 24 varies for example from W1 to W2. At a second segment 34b, the first set of pleat tips 30a extends substantially parallel to the axial direction x, such that the width of the pleats 24 varies for example from W2 to W3.

Fluid to be filtered flows generally axially in the direction of arrow F, enters the pleated filter media 12 as shown by the arrows F', flows through the axial flow channels 32 and the pleat segments 26 generally laterally (in the z-direction) as described above and shown by the arrows F'', and exits the pleated filter media 12 generally axially as shown by the arrows F'''. As was described with reference to FIG. 3, the configuration of FIG. 5 reduces pressure drop across the filter media 12 upon exit of the filter media 12 if fluid is flowing in the direction of the arrow F shown in FIG. 5. Likewise, if fluid were to flow substantially oppositely to the direction of the arrow F shown in FIG. 5, it would encounter reduced pressure drop due to the portion 34a of the plurality of pleats 24 that extends at an angle to the axial direction x. Again, increased open area is provided at the respective inlet and outlet ends of the filter 10.

Figure 6:
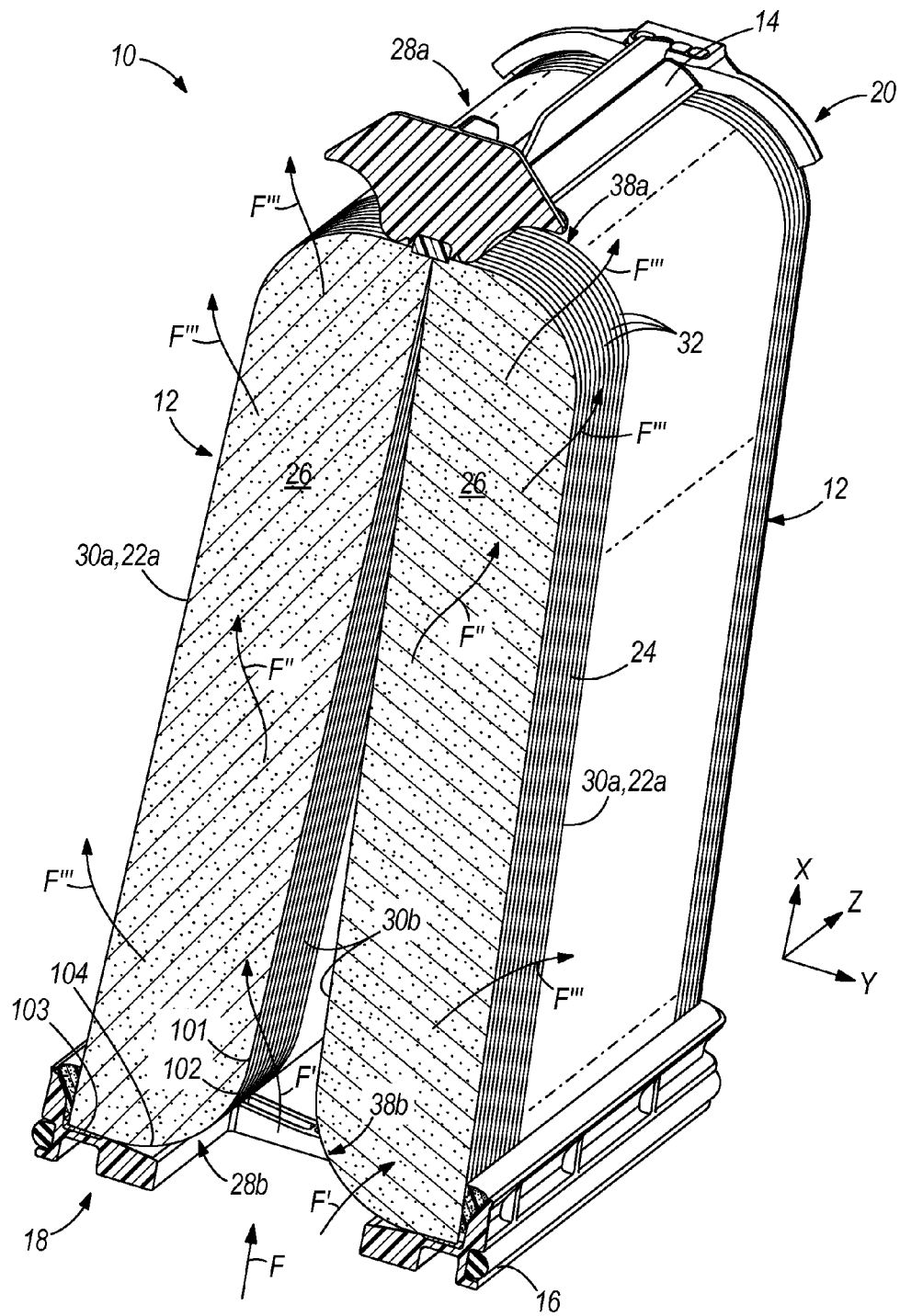
FIG. 6 is a perspective view of a filter according to a fifth example of the disclosure wherein a portion of a pleated filter media is curvilinear.
Figure 7:
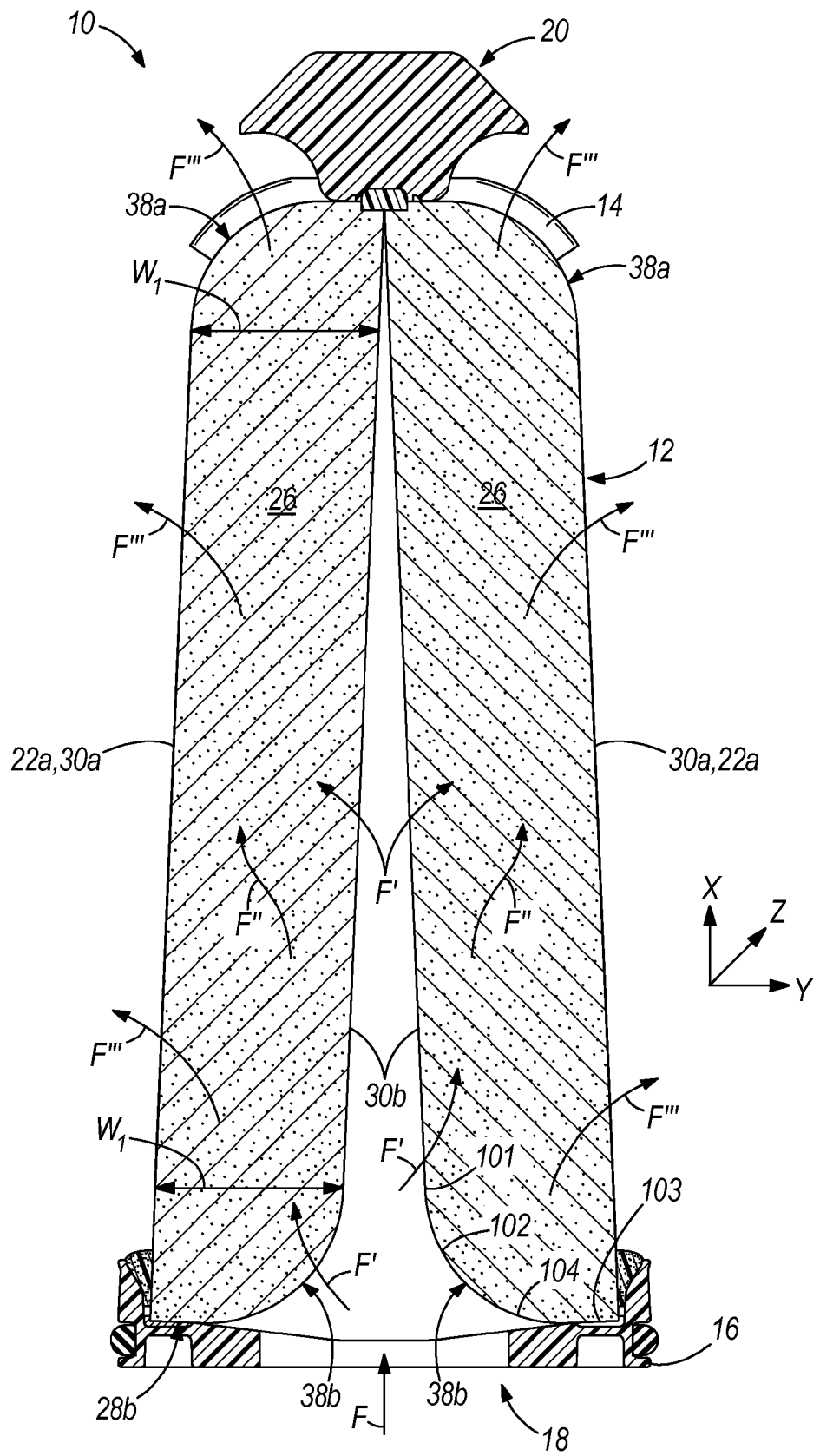
FIG. 7 is an end view of a filter according to the fifth example of the disclosure.

In the example of FIGS. 6 and 7, the width of the plurality of pleats 24 varies in the transverse direction y at least along a portion of the plurality of pleats 24. The portion of the plurality of pleats 24 comprises curvilinear portions 38a and 38b joining one of the first axial ends 28a and second axial ends 28b to one of the first set of pleat tips 30a and second set of pleat tips 30b, respectively. In the example shown, the width of the pleats 24 remains the same (W1) between the first set of pleat tips 30a and the second set of pleat tips 30b along the remainder of the portion of the plurality of pleats 24 that is not one of the curvilinear portions 38a, 38b. More specifically, at the inlet end 18, the second set of pleat tips 30b are joined to the second axial ends 28b by the curvilinear portion 38b. At the outlet end 20, the first set of pleat tips 30a are joined to the first axial ends 28a by the curvilinear portion 38a. Thus, in the example of FIGS. 6 and 7, the filter 10 comprises two opposing curvilinear portions 38a, 38b joining the first axial ends 28a to the first set of pleat tips 30a and joining the second axial ends 28b to the second set of pleat tips 30b. In this example, the curvilinear portions 38a, 38b are smooth curvilinear portions. Other variations of the example shown in FIGS. 6 and 7 are possible. For example, either the first curvilinear portion 38a or the second curvilinear portion 38b could be omitted. Further, the remainder of the pleats 24 that do not comprise one of the curvilinear portions 38a, 38b need not remain at width W1 between the first set of pleat tips 30a and the second set of pleat tips 30b; rather, the width of the plurality of pleats 24 could vary in the transverse direction y along this remainder portion as well, as shown in FIGS. 1-5. Then, the first sets of axial bend lines 22a could extend substantially parallel to the axial direction x and to one another such that the size of the end caps 14, 16 and housing (not shown) could remain similar to that of traditional filters.

Another way to describe the example of FIGS. 6 and 7 follows. One of the first and second sets of pleat tips 30a, 30b has a first filter media edge section 101 extending axially and a second filter media edge section 102 extending from the first filter media edge section 101 and curved from the axial direction x toward the transverse direction y. The first filter media edge section 101 merges into the second filter media edge section 102 along a continuous non-rectilinear transition. One of the first and second sets of axial ends 22a, 22b has a third filter media edge section 103 extending transversely (in the y direction) and a fourth filter media edge section 104 extending from the third filter media edge section 103 and curved toward the axial direction x. The third filter media edge section 103 merges into the fourth filter media edge section 104 along a continuous non-rectilinear transition. The second filter media edge section 102 and fourth filter media edge section 104 merge into each other along a continuous non-rectilinear transition as well. This continuous non-rectilinear transition has been referred to above as curvilinear portion 38a or 38b.

Fluid to be filtered enters the filter 10 generally axially in the direction of arrow F, enters the pleated filter media 12 via the arrows shown at F', flows through the axial flow channels 32 and the pleat segments 26 generally laterally (in the z-direction) as described above and shown by the arrows F'', and exits the pleated filter media 12 generally axially as shown by the arrows F'''. Due to the curvilinear portions 38a and 38b, fluid encounters reduced restriction when entering and exiting the filter 10. Compared to traditional filters, the fluid now encounters a smoother entry into (or exit from) the filter 10 due to the lack of sharp 90° angled pleat tips 30a, 30b. This results in lower pressure drop on entry and exit to and from the filter 10 because fluid takes on an ideal entry path. Thus, one of the first and second sets of pleat tips 30a, 30b and one of the first and second axial ends 28a, 28b meet at a set of reduced-restriction flow-conducive junctions, the set of reduced-restriction flow-conducive junctions having a fluid dynamic profile configured to reduce pressure drop therealong and provide lower restriction than a sharp 90° junction angle of the respective pleat tips 30a, 30b and axial ends 28a, 28b of the filter media 12. The noted increased open area is provided at the respective inlet and outlet of the filter 10.

Figure 8:
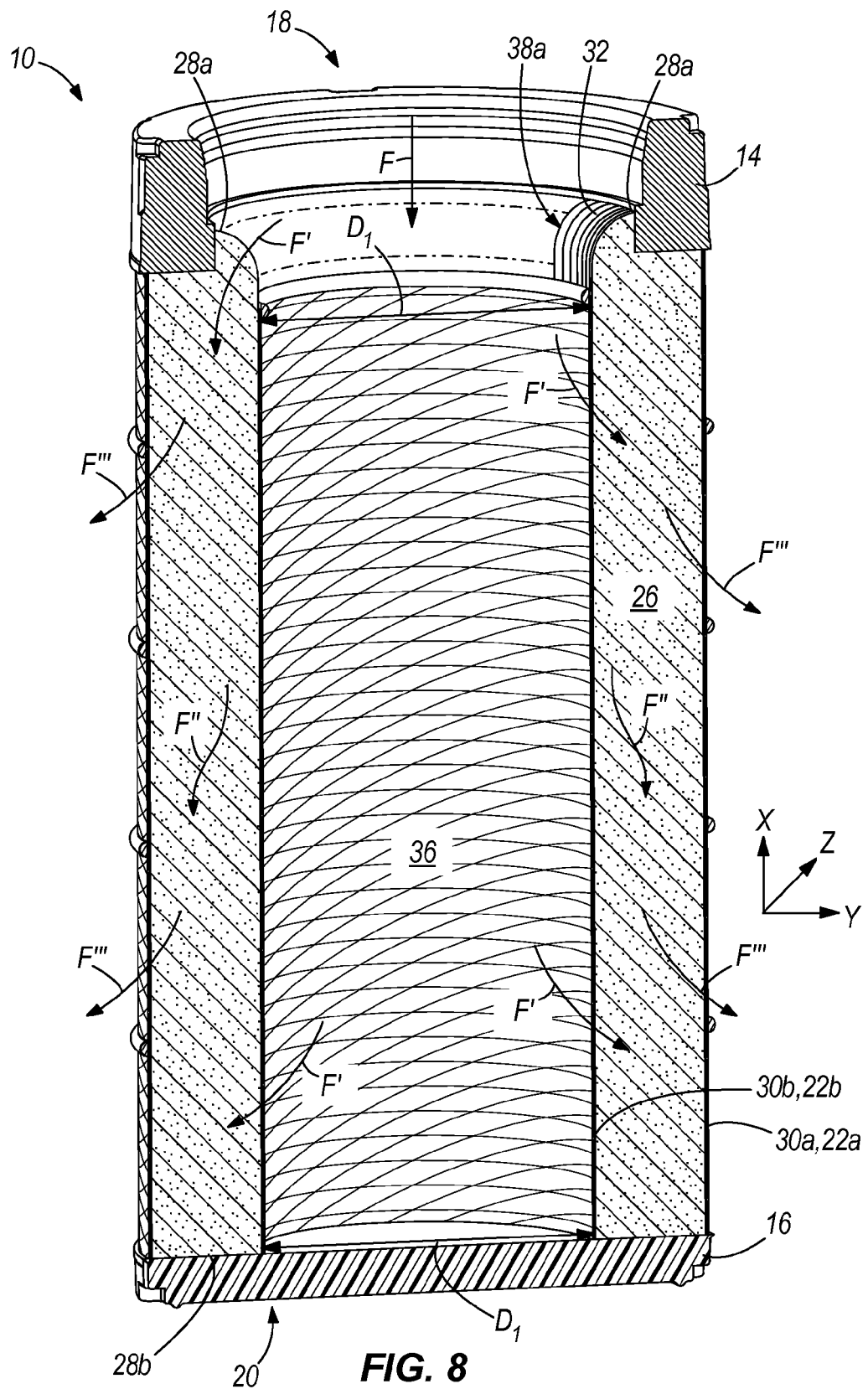
FIG. 8 is a cross section of a filter according to a sixth example of the disclosure wherein a portion of a cylindrical pleated filter media is curvilinear.

FIG. 8 shows a cross section of a filter 10 according to a sixth example. In this example, the pleated filter media 12 is cylindrical and defines a central opening 36 of which the diameter D1 remains the same except for at a curvilinear portion 38a. The width of the plurality of pleats 24 between a first set of pleat tips 30a and a second set of pleat tips 30b in the transverse direction y remains constant in the axial direction x until the curvilinear portion 38a is reached. At the curvilinear portion 38a, the second set of pleat tips 30b are joined to first axial ends 28a. The pleated filter media 12 is held in its cylindrical shape by the end caps 14, 16.

Fluid to be filtered flows generally axially into the filter 10 in the direction of arrow F. Fluid flows through the axial flow channels 32, through the plurality of pleat segments 26 generally laterally (in the z-direction) as described above and shown by the arrows F''', and then exits the filter media 12 generally axially as shown by arrows F''''. In this way, fluid encounters reduced restriction as described above as it enters at the ideal entry-shaped first curvilinear portion 38a. Fluid can flow through the filter 10 as shown at arrows F; however, as with all examples herein, the direction and path of fluid flow may vary from that shown and described. For example, fluid can flow opposite of the direction shown at arrows F.

Figure 9:
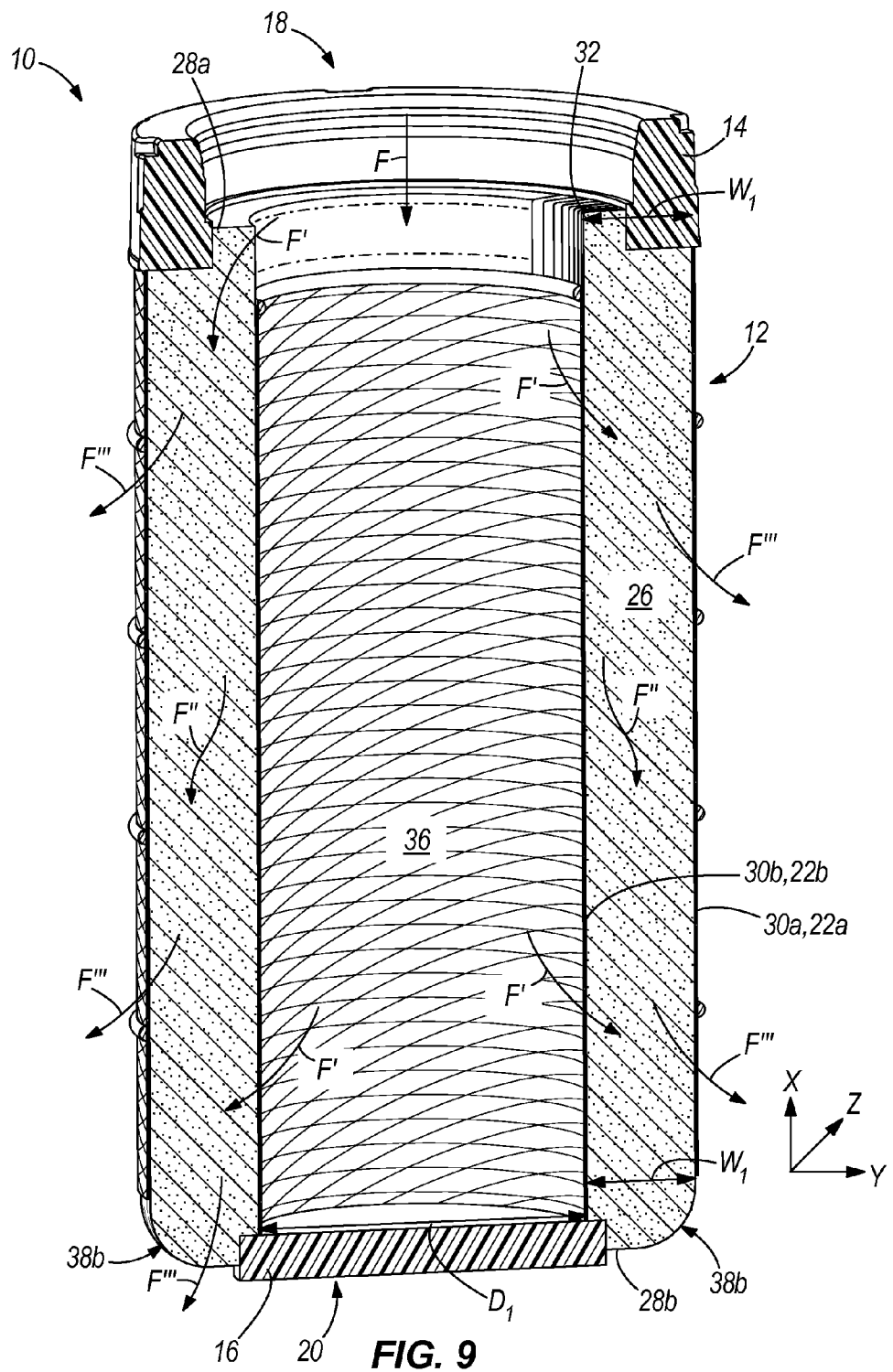
FIG. 9 is a cross section of a filter according to a seventh example of the disclosure wherein a portion of a cylindrical pleated filter media is curvilinear.

FIG. 9 shows a cross section of a filter 10 according to a seventh example. In this example, the width W1 of the pleats 24 does not vary between a first set of pleat tips 30a and a second set of pleat tips 30b until a curvilinear portion 38b is reached. The curvilinear portion 38b joins the first set of pleat tips 30a to the second axial ends 28b. The pleated filter media 12 is cylindrical and defines a central opening 36 having a diameter D1 that remains the same along the length of the filter media 12 in the axial direction x. Although not depicted here, the second set of pleat tips 30b could be joined to the first axial ends 28a as well, as shown in FIG. 8.

Fluid to be filtered enters the filter at the inlet end 18 as shown by the arrow F, flows through the axial flow channels 32 and the plurality of pleat segments 26 generally laterally (in the z-direction) as described above and shown by the arrows F''', and exits the filter 10 generally axially as shown by the arrow F''''. Due to the curvilinear portion 38b, fluid encounters reduced restriction as described above when exiting the filter 10. Fluid can flow through the filter 10 as shown at arrows F; however, as with all examples herein, the direction and path of fluid flow may vary from that shown and described. For example, fluid can flow opposite of the direction shown at arrows F.

Figure 10:
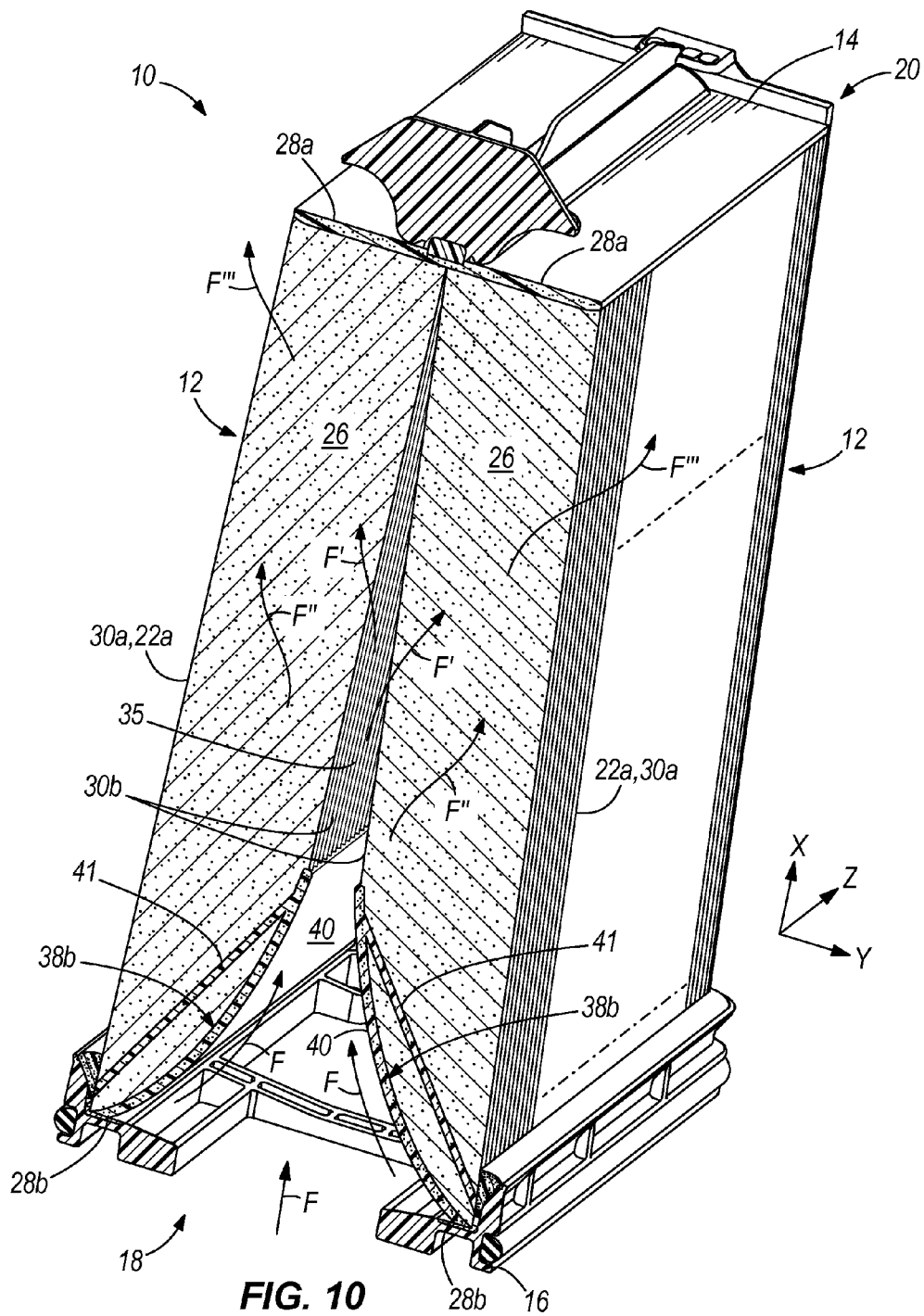
FIG. 10 is a perspective view of a filter according to an eighth example of the disclosure wherein a portion of a pleated filter media is curvilinear and comprises a seal.

FIG. 10 shows an eighth example of a filter 10 similar to the example shown in FIGS. 6 and 7. A second set of pleat tips 30b and second axial ends 28b are joined by a curvilinear portion 38b. In this example however, the filter 10 comprises a seal 40 on the curvilinear portion 38b. The seal 40 seals off the pleat tips 30b completely. Sealing off the pleat tips 30b completely causes fluid entering the filter 10 generally as shown by the arrow F to encounter even more reduced restriction than a filter with a curvilinear portion but no seal due to the combination of the curvilinear portion 38b and the smooth seal 40 that guide fluid into the V-shaped channel 35. A glue line 41 for each filter media 12 is shown extending at an angle to the axial direction x. The glue line 41 seals off alternating axial flow channels 32 as described above. However, in order to utilize more area within the filter media 12, the glue line 41 could be located more immediately adjacent to the seal 40 and could follow the shape of the seal 40 as well.

Figure 11:
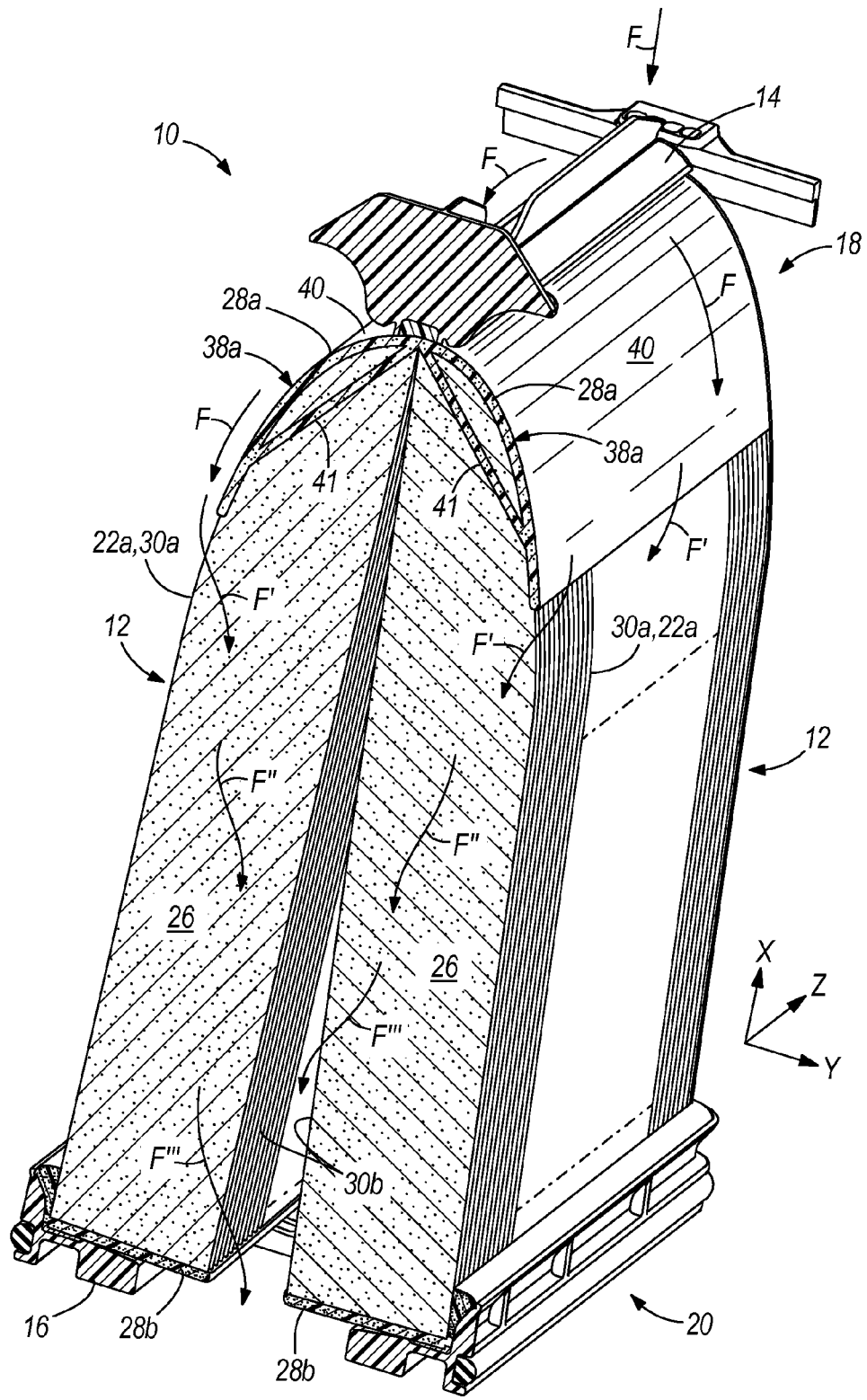
FIG. 11 is a perspective view of a filter according to a ninth example of the disclosure wherein a portion of a pleated filter media is curvilinear and comprises a seal.

FIG. 11 shows a ninth example of a filter 10 that is also similar to the example of FIGS. 6 and 7. A first set of pleat tips 30a are joined to first axial ends 28a at a curvilinear portion 38a. A seal 40 is on the curvilinear portion 38a. In this example, the inlet end 18 and the outlet end 20 are reversed from previous examples. The seal 40 over the curvilinear portion 38a reduces the restriction on fluid as it flows into the filter at the inlet end 18 and is guided further toward the pleated filter media 12 as is shown by the arrows F. Fluid then enters the filter media 12 as shown by the arrows F', flows through the axial flow channels 32 and the pleat segments 26 generally laterally (in the z-direction) as described above and shown by the arrows F''', and exits the pleated filter media 12 and the outlet end 20 generally axially as shown by the arrows F''''.

Figure 12:
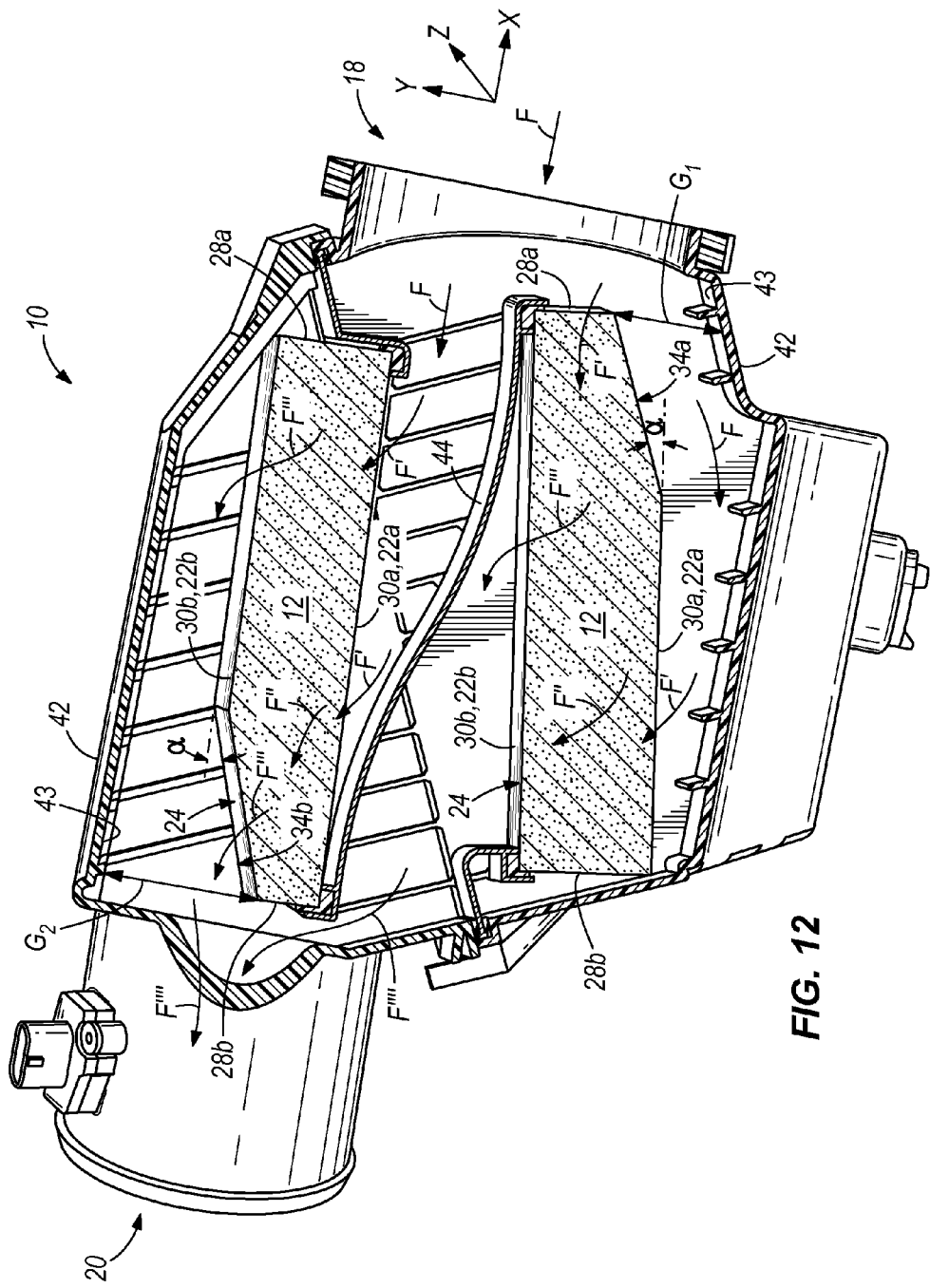
FIG. 12 is a cross section of a filter according to a tenth example of the disclosure wherein opposing pleated filter media define a Z-filter arrangement.

FIG. 12 shows a tenth example of a filter 10 having a Z filter arrangement. The filter 10 comprises a housing 42 retaining two pleated filter media 12. The Z filter arrangement has an inlet end 18 and an outlet end 20 defined by the housing 42. The pleated filter media 12 are held together by an internal dividing wall 44. The pleated filter media 12 shown in this example both comprise at least one segment 34a, 34b of a portion of a plurality of pleats 24 having a set of pleat tips 30a, 30b oriented at an angle α with respect to the axial direction x. For example, regarding the lower pleated filter media 12, the first set of pleat tips 30a extend at the angle α to the axial direction x. Regarding the upper pleated filter media 12, the second set of pleat tips 30b extend at an angle α to the axial direction x. However, the pleat tips 30a, 30b in the upper and lower filter media 12 need not extend at the same angle to the axial direction x. A second set of bend lines 22b of the lower filter media 12 is substantially parallel to the axial direction x, while a first set of bend lines 22a of the upper filter media 12 is substantially parallel to the axial direction x. The opposing filter media 12 thus define a Z filter arrangement. Z filter arrangements are further described in U.S. Pat. No. 7,540,895, which is incorporated by reference herein in entirety. The terms "upper" and "lower" are used here only to clarify description of the example shown, and are not intended to be limiting.

Fluid to be filtered flows generally axially into the filter 10 through the inlet end 18 as shown by the arrow F. Fluid enters the pleated filter media 12 generally axially as shown by the arrows F'. Fluid flows through the axial flow channels 32 and the axial pleat segments 26 generally laterally (in the z-direction) as described above and shown by the arrows F. Fluid then exits the pleated filter media 12 generally axially as shown by the arrows F''' and finally exits the filter 10 at the outlet end 20 as shown by the arrows F''''. In a traditional Z filter arrangement, the area between the surface of the filter media 12 and the inner wall surface 43 of the housing 42 is small and creates a region of high pressure drop. Pressure drop is reduced by increasing the gap between the inner wall surface 43 of the housing 42 and the surface of the lower pleated filter media 12 as is shown for example at G1. Creating the gap G1 is accomplished by varying the pleat width along segment 34a of the lower pleated filter media 12. Likewise, pressure drop upon exit from the upper pleated filter media 12 is reduced by increasing a gap G2 between the surface of the upper pleated filter media 12 and the inner wall surface 43 of the housing 42. Creating the gap G2 is accomplished by varying the pleat width along segment 34b of the upper pleated filter media 12.

Figure 13:
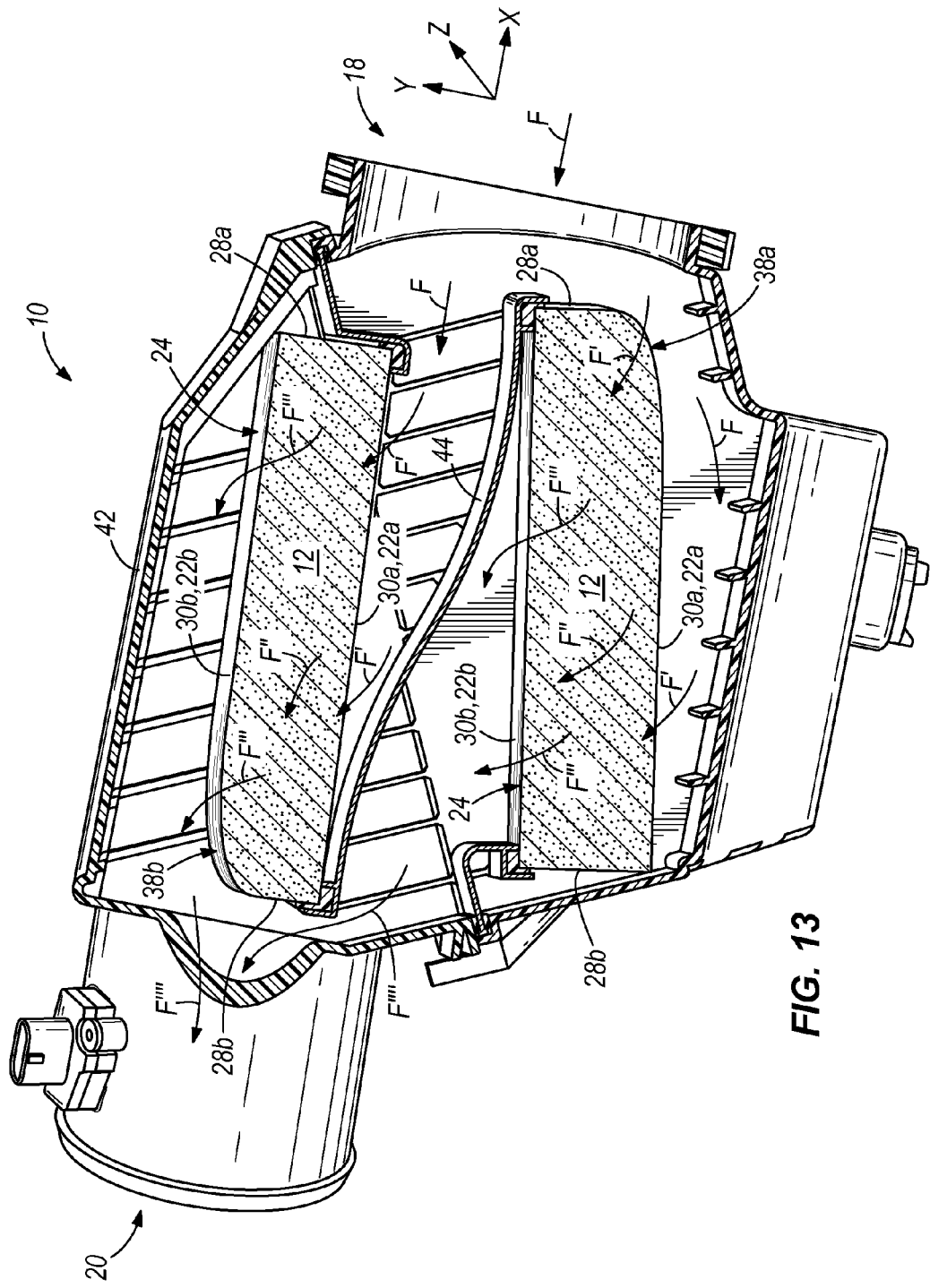
FIG. 13 is a cross section of a filter according to an eleventh example of the disclosure wherein opposing pleated filter media define a Z-filter arrangement.

FIG. 13 shows an eleventh example of a filter 10 having a Z filter arrangement. This example is similar to the example of FIG. 12, except it has curvilinear portions 38a, 38b rather than linear segments 34a, 34b as shown in FIG. 12. A first set of pleat tips 30a of the lower pleated filter element 12 are joined to first axial ends 28a by a curvilinear portion 38a. A second set of pleat tips 30*b* of the upper pleated filter media 12 are joined to second axial ends 28*b* by a curvilinear portion 38*b*. A second set of bend lines 22*b* of lower pleated filter media 12 is substantially parallel to the axial direction x along the length of the filter media 12 and a first set of bend lines 22*a* of upper pleated filter media 12 is substantially parallel to the axial direction x along the length of the filter media 12. Other reference numbers in FIG. 13 correspond to those in FIG. 12.

Pressure drop is reduced by the configuration shown in FIG. 13 in much the same way as pressure drop is reduced by the configurations shown in FIG. 12 and FIGS. 6 and 7. Fluid experiences reduced restriction along curvilinear portions 38*a* and 38*b* and thus pressure drop along the pleated filter media 12 is reduced. Although not shown here, one or more of the curvilinear portions 38*a*, 38*b* could further comprise a seal 40 such as that shown in FIGS. 10 and 11.

Figure 14A:
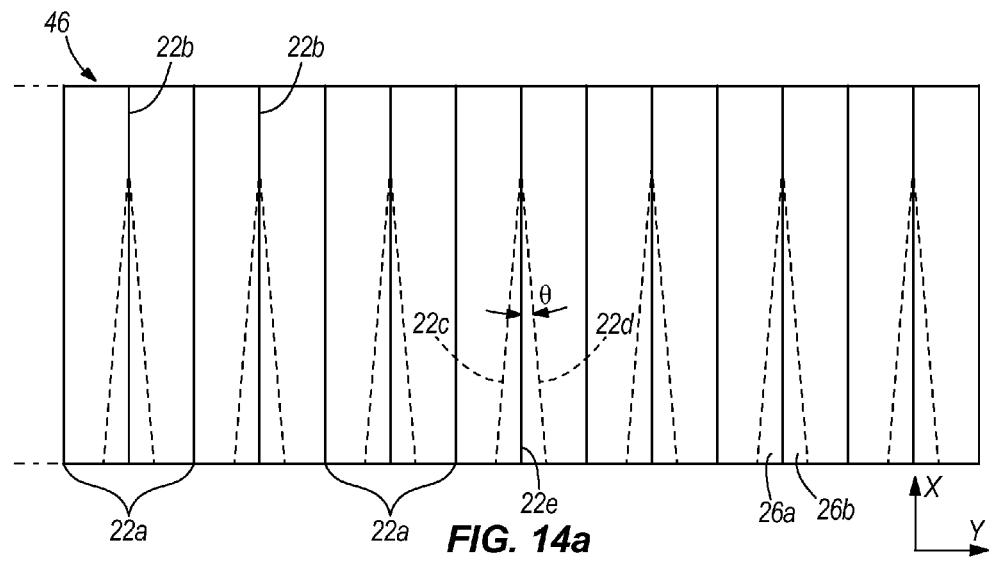
FIG. 14a is a top view of a filter media according to a first method for forming the filter media of the disclosure by folding the filter media along a plurality of bend lines.

Different methods for forming the pleated filter media 12 will now be described with reference to FIGS. 14*a*-18. FIG. 14*a* shows a filter media 46 on which first and second sets of bend lines 22*a*, 22*b* are formed. The filter media 46 can be folded to form a plurality of pleats 24 comprised of pleat segments 26 extending in the axial direction x between first and second axial ends 28*a*, 28*b* and extending in the transverse direction y between first and second sets of pleat tips 30*a*, 30*b* at least partially defined by first and second sets of bend lines 22*a*, 22*b*. Axial flow channels 32 are defined between the pleat segments 26 in the lateral direction z such that the plurality of pleats 24 has a width in the transverse direction y that varies along the axial direction x. Although not shown here, the varied width can be accomplished by forming a curvilinear portion joining one of the first and second axial ends 28*a*, 28*b* to one of the first and second sets of pleat tips 30*a*, 30*b*, respectively. This example of a pleated filter media 12 is shown in FIGS. 6 and 7. Alternatively, the varied width can be accomplished by joining one of the first and second axial ends 22*a*, 22*b* to one of the first and second sets of pleat tips 30*a*, 30*b*, respectively, by a linear portion 34, as shown in FIGS. 1-4.

Figure 14B:
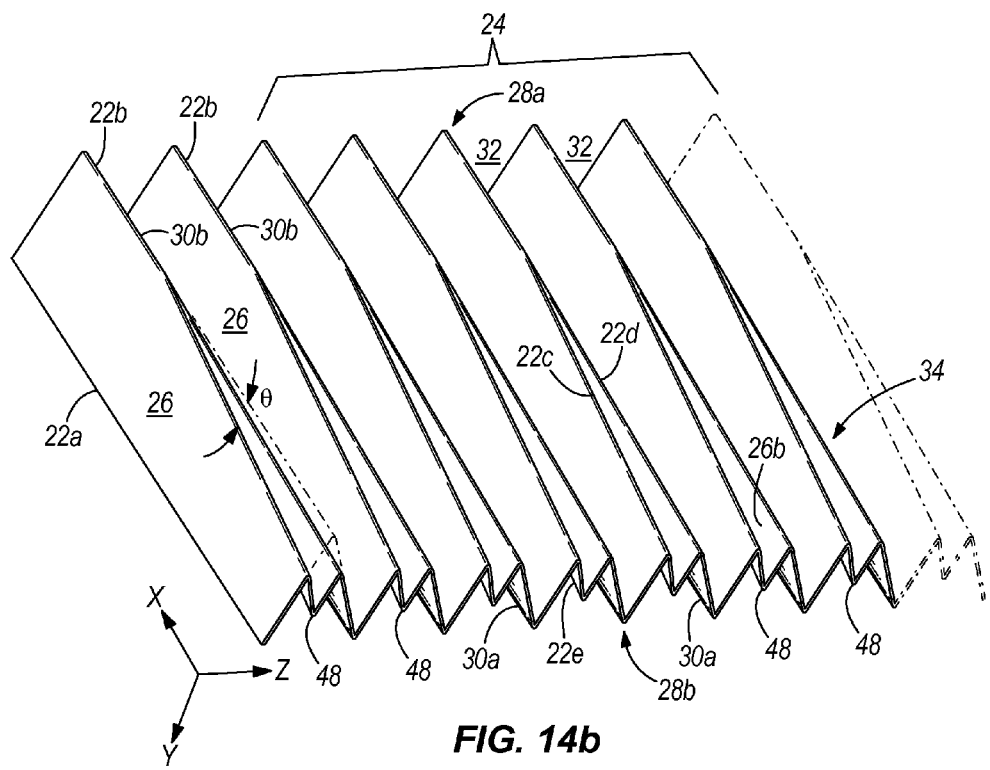
FIG. 14b is an isometric view of the filter media according to the first method for forming the filter media of the disclosure.

In one example shown in FIGS. 14*a* and 14*b*, the linear portion 34 of the plurality of pleats 24 is formed by a plurality of sunken pleats 48 interdigitated amongst pleat segments 26 in the lateral direction z. The sheet of filter media 46 is folded to form the plurality of sunken pleats 48. The filter media 46 is folded so that the first and second sets of bend lines 22*a*, 22*b* extend axially and so that each sunken pleat in the plurality of sunken pleats 48 extends inwardly in the transverse direction z from one of the first and second sets of pleat tips 30*a*, 30*b* so as to form third, fourth, and fifth sets of bend lines 22*c*, 22*d*, 22*e* extending at an angle θ to the axial direction x. Each sunken pleat in the plurality 48 comprises sunken pleat segments 26*a*, 26*b* extending in the transverse direction y between the fifth bend line 22*e* and one of the third and fourth bend lines, 22*c*, 22*d*. For example, sunken pleat segment 26*a* is formed between bend lines 22*c* and 22*e*. Likewise, sunken pleat segment 26*b* is formed between bend lines 22*e* and 22*d*. Each sunken pleat in the plurality 48 thus has a triangular cross section in the axial direction x and in the transverse direction y.

As discussed in reference to the embodiments herein above, the folding method advantageously creates a filter media 12 having reduced restriction at one or both of the inlet and outlet ends of the filter 10. Increased open area at the noted inlet and/or outlet ends can be provided. Further, the plurality of pleats can optionally, advantageously be completely sealed with a suitable agent, such as urethane, thus avoiding the relatively costly process of alternate sealing. Further, according to some examples, the pleat depth ratio (i.e. width W2 in the transverse direction y at one location vs. width W1 in the y direction at another location can advantageously range in value up to 2.

Figure 15A:
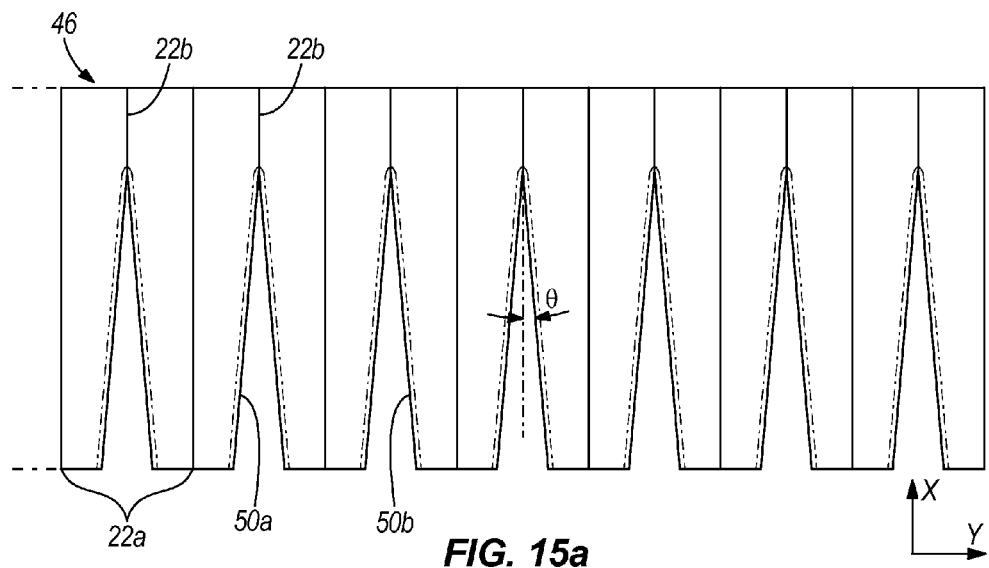
FIG. 15a is a top view of a filter media according to a second method for forming the filter media of the disclosure by forming, cutting, and bonding the filter media.
Figure 15B:
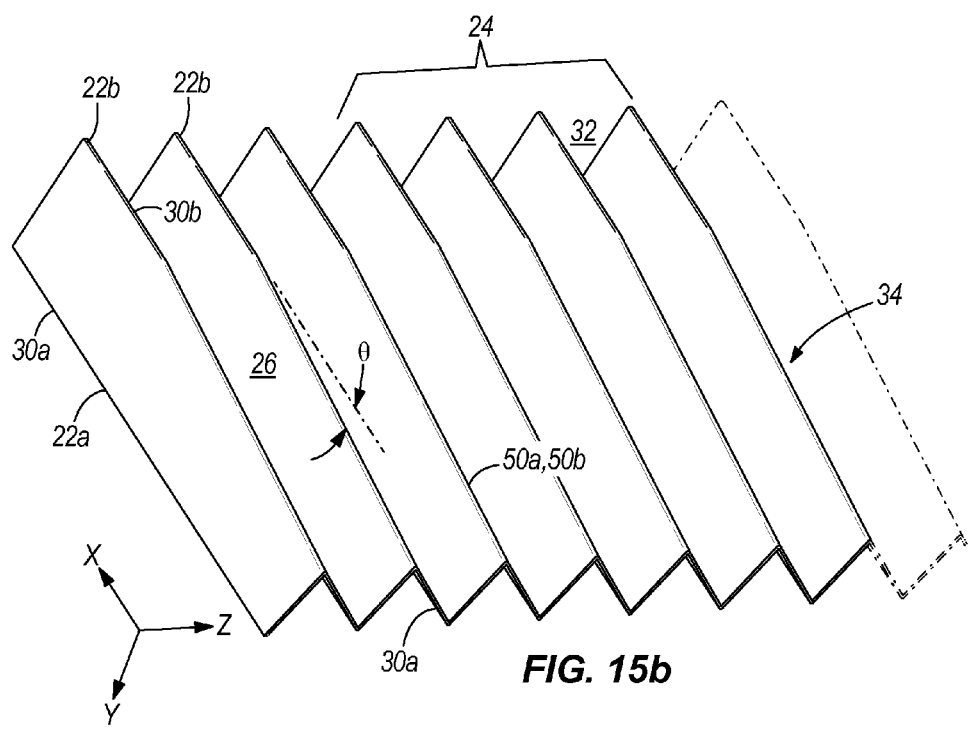
FIG. 15b is an isometric view of the filter media according to the second method for forming the filter media of the disclosure.

In another example shown in FIGS. 15*a* and 15*b*, the linear portion 34 of the plurality of pleats 24 is formed by sets of bonded edges 50*a*, 50*b* extending at an angle θ from one of first and second sets of axially extending bend lines 22*a*, 22*b*. The sheet of filter media 46 is folded so that the first and second sets of bend lines 22*a*, 22*b* extend axially. Then the sheet of filter media 46 is cut to form opposing edges 50*a*, 50*b* of pleat segments 26 extending at the angle θ from one of the first and second sets of axially extending bend lines 22*a*, 22*b*. In the example shown, the opposing edges 50*a*, 50*b* extend from the second set of bend lines 22*b*. Then, the edges 50*a*, 50*b* are bonded together. This creates pleat segments 26 that have widths that are axially (in the x-direction) and transversely (in the y-direction) coextensive with each other and vary substantially equally in the transverse direction y. The opposing edges 50*a*, 50*b* can be bonded in many different ways, for example with glue applied along the dashed lines shown in FIG. 15*a*.

Figure 16:
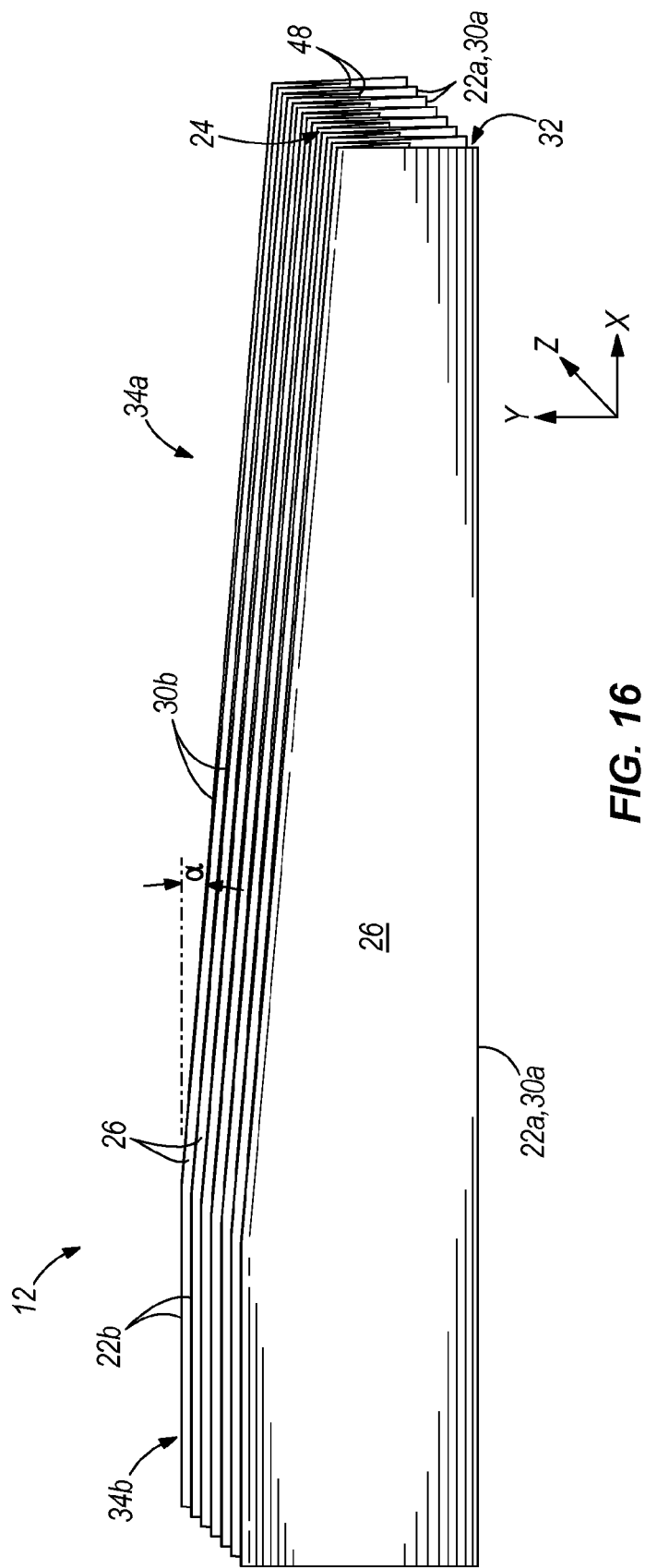
FIG. 16 is an isometric view of a pleated filter media according to the first and second methods for forming the filter media of the disclosure.

FIG. 16 shows a close-up view of the folded filter media 12. The filter media 12 has pleat segments 26 and axial flow channels 32. Also shown are first and second sets of bend lines 22*a*, 22*b* and first and second sets of pleat tips 30*a*, 30*b*. In the example shown, the first set of bend lines 22*a* and the first set of pleat tips 30*a* extend substantially parallel to the axial direction x along the length of the filter media 12. A first segment 34*a* of the second set of pleat tips 30*b* extends at an angle α to the axial direction x. A second portion 34*b* of the pleated filter media 12 has axial bend lines 22*b* and pleat tips 30*b* that extend substantially parallel to the axial direction x. Thus, the pleat tips 30*a*, 30*b* are only partially defined by the bend lines 22*a*, 22*b*, except where the bend lines 22*a*, 22*b* do not extend axially, or where they are cut to form a linear or curvilinear portion. In this example, a plurality of sunken pleats 48 is also shown. However, as in the example of FIGS. 15*a* and 15*b*, the sunken pleats 48 could be removed and the remaining edges bonded together along first and second edges 50*a*, 50*b*.

Figure 17:
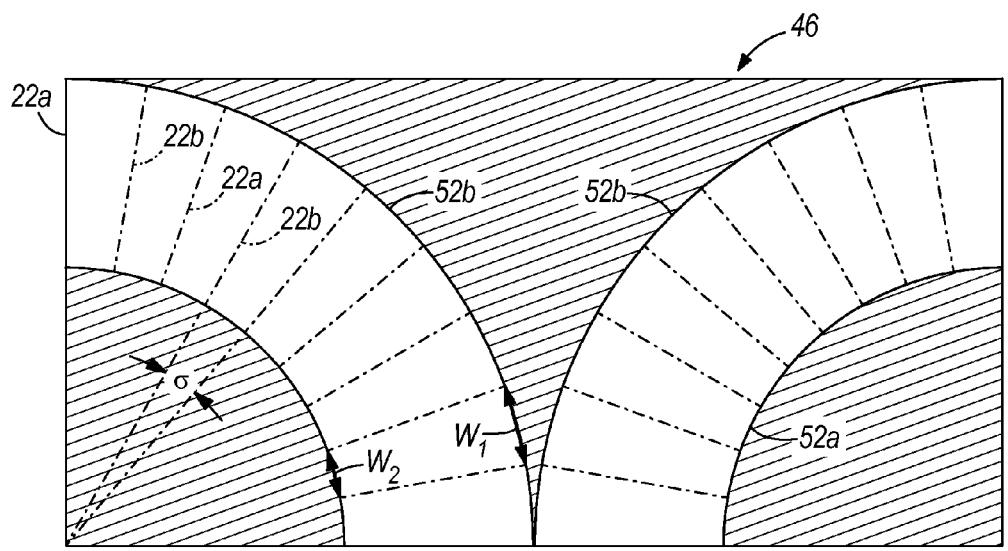
FIG. 17 is a top view of a filter media according to a third method for forming the filter media of the disclosure by folding the filter media along radial bend lines.
Figure 18:
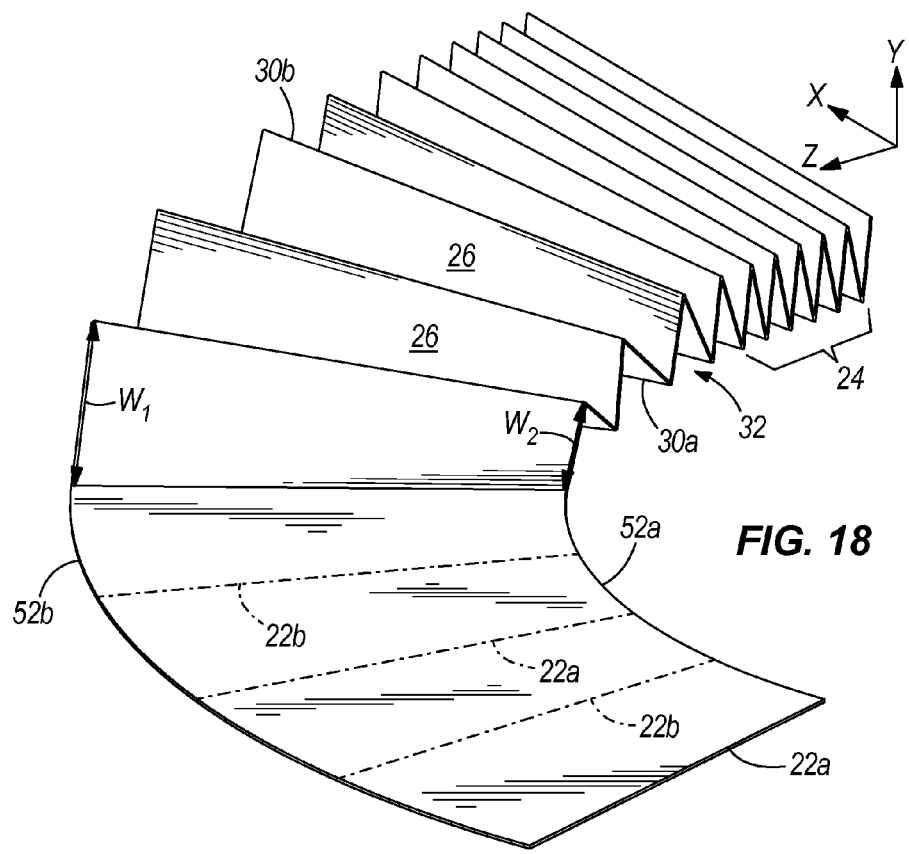
FIG. 18 is an isometric view of the filter media according to the third method for forming the filter media of the disclosure.

FIGS. 17 and 18 depict a third method for forming the pleated filter media 12. A filter media 46 is cut into an arc along the arced lines 52*a* and 52*b*. The left-over portions (shown hatched) of filter media 46 are discarded. The sheet of filter media 46 is folded back and forth so that first and second sets of bend lines 22*a*, 22*b* extend radially at angles to the axial direction x. In the example shown, these angles are σ. FIG. 18 shows how folding the filter media 46 in this way results in pleat segments 26 having a width that varies along the axial direction x in the transverse direction y. The width varies for example from W1 to W2.

Figure 19:
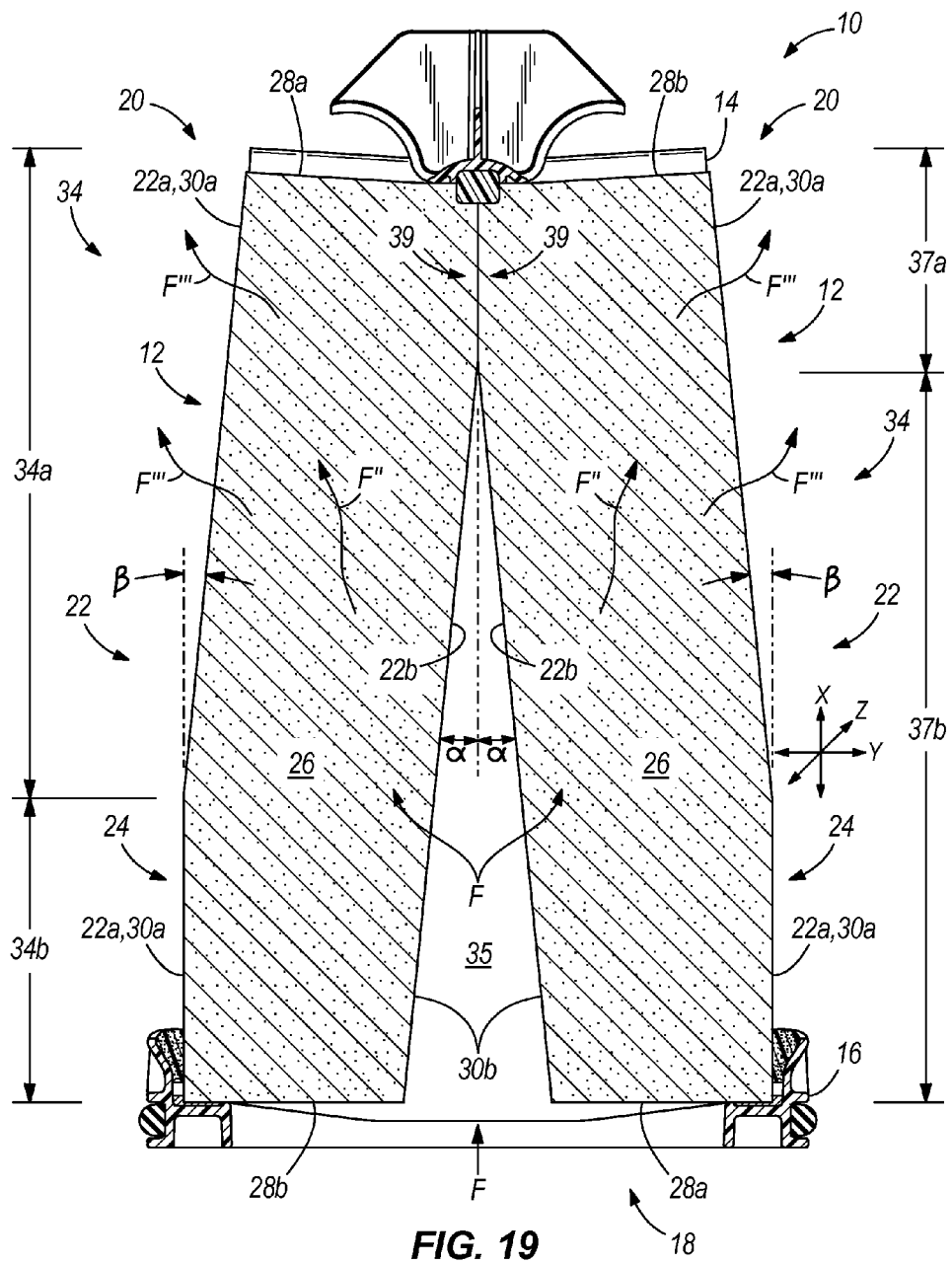
FIG. 19 is an end view of a filter according to a twelfth example of the disclosure wherein portions of a pleated filter media have varying width.

FIG. 19 depicts a twelfth example of a filter 10 having two pleated filter media 12. Like reference numbers from the examples described herein above are included on FIG. 19 for similar structures. As with the previous examples, the pleated filter media 12 extend in the axial direction x, transverse direction y that is perpendicular to the axial direction x, and lateral direction z that is perpendicular to the axial direction x, and perpendicular to the transverse direction y. The filter 10 includes end caps 14, 16. Fluid to be filtered flows generally directly axially through the filter 10 from the inlet end 18 to the outlet end 20 as shown by the arrows F, or in a direction opposite to that shown by arrows F. The terms "inlet end" and "outlet end" are not intended to be limiting, and fluid may flow in directions other than that described with reference to these figures, such as oppositely from the end 20 to the end 18.

The pleated filter media 12 is pleated along the plurality of bend lines 22 extending in the axial direction x. The plurality of bend lines 22 comprises a first set of bend lines 22a and a second set of bend lines 22b, as in the examples described herein above. The first and second sets of bend lines 22a, 22b partially define a plurality of pleats 24. The pleats 24 are comprised of pleat segments 26 that extend in the axial direction x between first axial ends 28a and second axial ends 28b. The pleat segments 26 also extend in the transverse direction y between a first set of pleat tips 30a and a second set of pleat tips 30b. As described above, the first and second sets of pleat tips 30a, 30b are at least partially defined by the first and second sets of bend lines 22a, 22b.

The width of the plurality of pleats 24 varies in the transverse direction y at least along portions of the plurality of pleats 24. In this example, the first sets of pleat tips 30a extend at an angle β from the axial direction x along a linear portion 34a. The second sets of pleat tips 30b extend at an angle from the axial direction x along a linear portion 37b. Each pleated filter media 12 thus comprises linear portions 34a, 37b, respectively, that extend at angles to the axial direction x. Portion 34b of the first set of pleat tips 30a and portion 37a of the second set of pleat tips 30b extend along or generally parallel to the axial direction x.

As discussed, the filter 10 has two opposing filter media 12 retained by end caps 14, 16. Each opposing filter media 12 has the noted second set of pleat tips 30b oriented at the angle α at the noted linear portion 37b with respect to the axial direction x such that the opposing filter media 12 define a channel 35 therebetween having V-shaped cross section along the axial direction x. For each filter media 12, the first set of pleat tips 30a are oriented at the angle β with respect to the axial direction x at the noted linear portion 34a. The pair of pleated filter medias 12 are aligned with each other such that the respective second sets of pleat tips 30b along the second set of bend lines 22b at portions 37a abut each other at 39.

Fluid flows into the filter 10 generally axially in the direction of arrow F, or oppositely thereto, as described above. It enters the filter 10 as denoted by the arrows F', then flows through the pleated filter media 12, through the pleat segments 26 generally laterally (in the z direction), and through the axial flow channels 32, as described above and shown by arrows F''. Fluid then exits the filter media 12 generally axially as shown by arrows F'''. Conversely, fluid can flow oppositely from the direction shown.

As discussed above, the V-shaped channel 35 increases the flow area between the two filter media 12 and thus decreases pressure drop. The portions 34a of the plurality of pleats 24 provides for decreased pressure drop and increased flow area as fluid exits the pleated filter media 12. Further, if fluid were to flow in a direction substantially opposite to that shown in FIG. 19, fluid entering the pleated filter media 12 at the portions 34a would also experience decreased pressure drop. Alignment of the respective filter media 12 such that the portions 37a of the respective sets of pleat tips 30b at 39 are adjacent allows for the filter 10 to adhere to smaller packaging requirements.

FIGS. 20-22 depict further examples of pleated filter media 12 and methods for forming pleated filter media 12 having portions that extend at an angle to the noted axial direction x, similar to for example the linear portions 34a and 37b shown in FIG. 19 and discussed herein above. The examples shown in FIGS. 20-22 advantageously provide increased pleat depth variability, wherein pleat depth ratio can vary up to 3, as will be described herein below. Like reference numbers are applied herein below with respect to the examples described herein above.

Figure 20A:
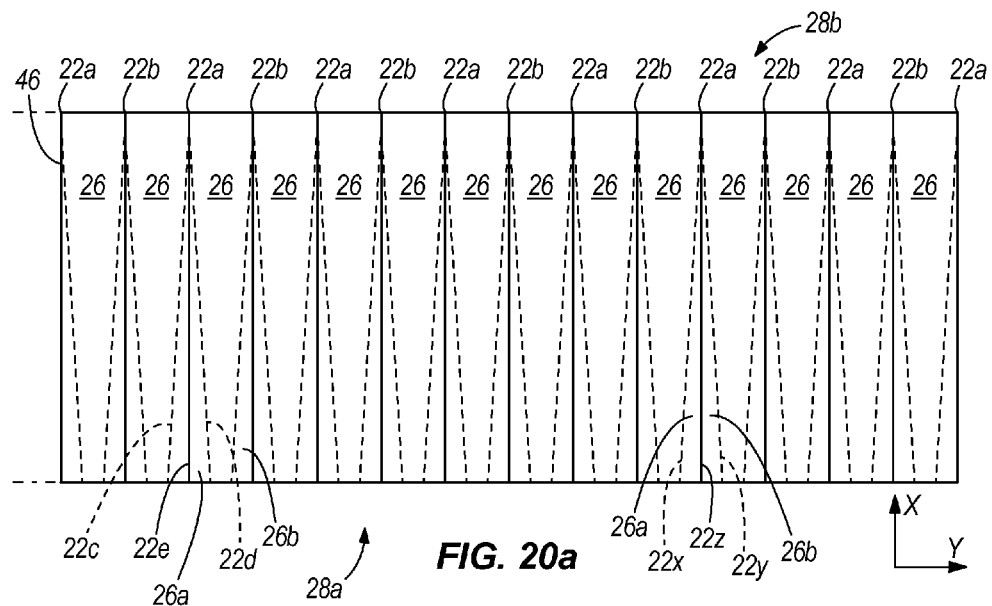
FIG. 20a is a top view of a filter media according to a fourth method for forming the filter media of the disclosure by folding the filter media along a plurality of bend lines.
Figure 20B:
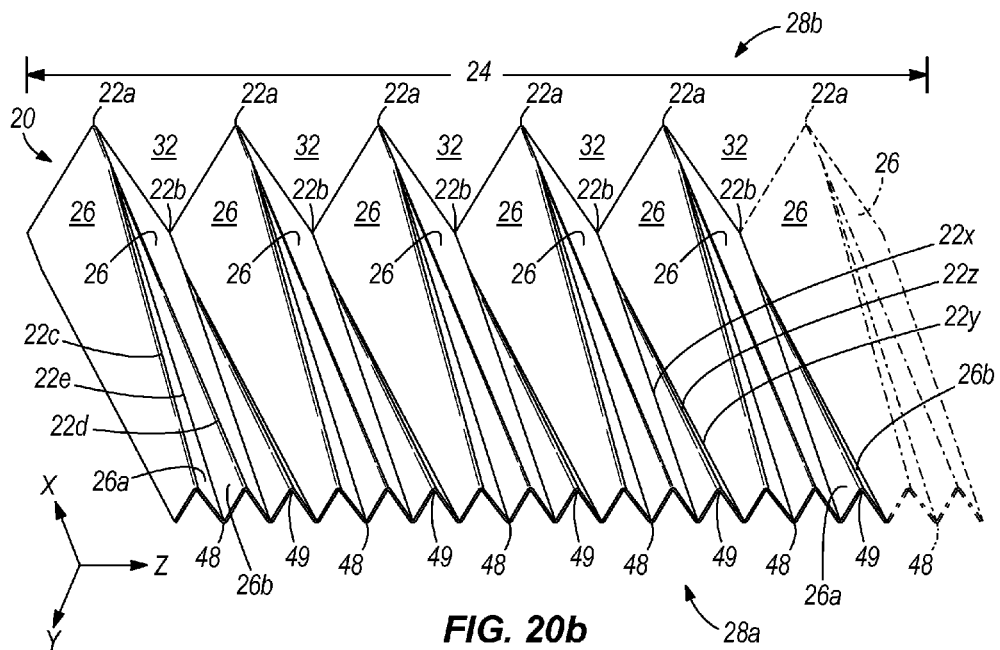
FIG. 20b is an isometric view of the filter media according to the fourth method for forming the filter media of the disclosure.
Figure 20C:
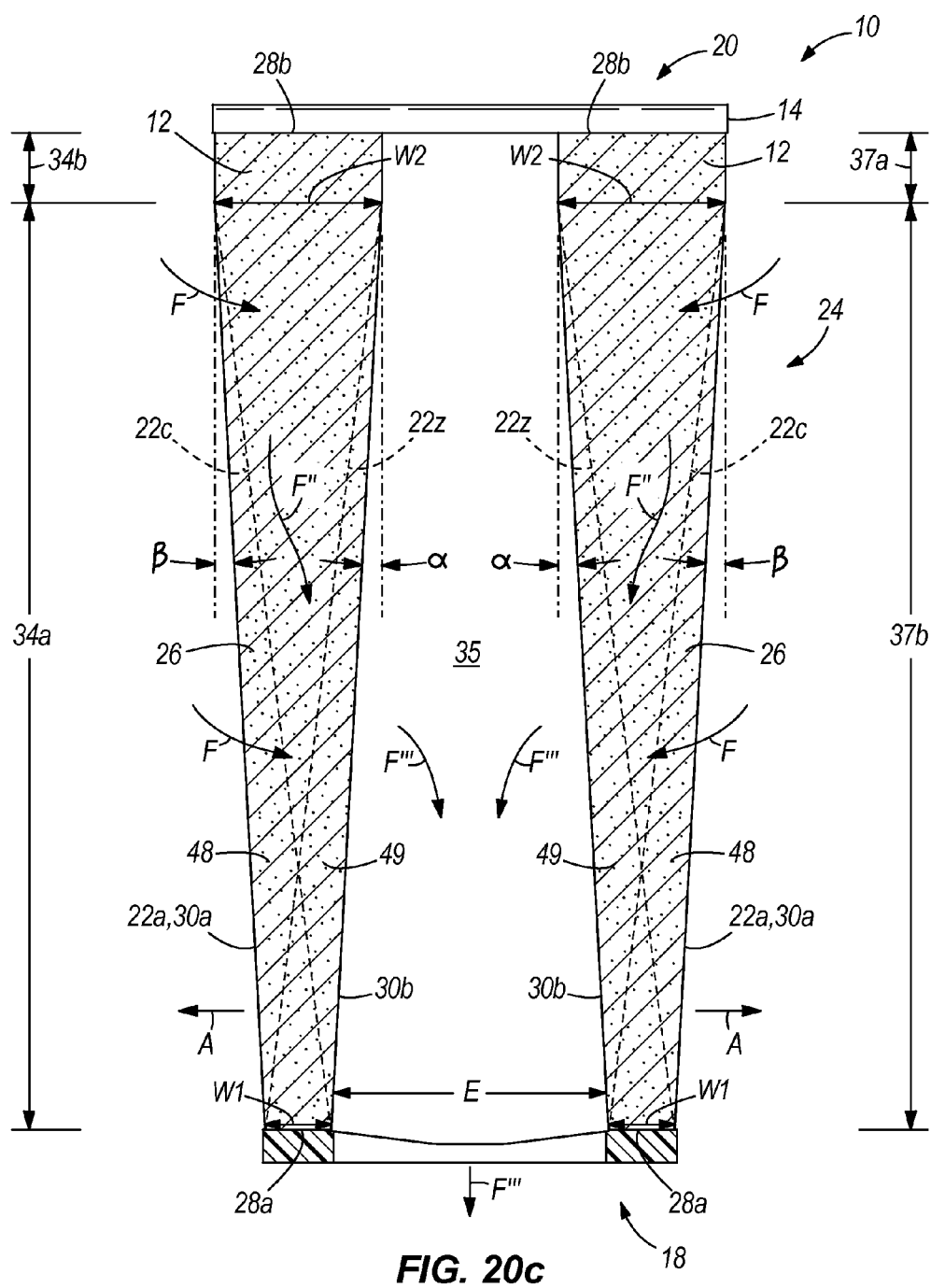
FIG. 20c is an end view of a filter having the filter media, formed by the fourth method.

FIGS. 20a-20c show one such example. Referring first to FIG. 20c, cylindrical pleated filter media 12 is shown in a filter 10 having opposing end caps 14, 16. Pleated filter media 12 has a first set of pleat tips 30a that extend at an angle β from the axial direction x along a linear portion 34a. Pleated filter media 12 also has a second set of pleat tips 30b that extends at an angle α from the axial direction x along a linear portion 37b. Pleated filter media 12 thus comprises opposing linear portions 34a, 37b, respectively, that each extend at angles to the axial direction x. The first linear portion 34a extends along the first set of bend lines 22a and the second linear portion 37b extends along the second set of bend lines 22b. In this example, pleat depth ratio W2/W1 can range up to at least 3. Fluid can flow through the filter 10 as shown at arrows F; however, as with all examples herein, the direction and path of fluid flow may vary from that shown and described. For example, fluid can flow opposite of the direction shown at arrows F.

Referring now to FIGS. 20a and 20b, the first linear portion 34a of filter media 12 is defined by a plurality of sunken pleats 48 extending along the first set of bend lines 22a. The second linear portion 37b is defined by a second plurality of sunken pleats 49 extending along the second set of bend lines 22b. The first plurality of sunken pleats 48 extends from the first axial end 28a and the second plurality of pleats 49 also extends from the first axial end 28a. Each sunken pleat in the first plurality of sunken pleats 48 is bent inwardly in the transverse direction y from the first set of pleat tips 22a so as to form third, fourth and fifth sets of bend lines 22c, 22d, 22e extending at least one angle to the axial direction x. Each sunken pleat 48 in the plurality of sunken pleats 48 has sunken pleat segments 26a, 26b extending in the transverse direction y between the noted fifth bend line 22e and one of the third and fourth bend lines 22c, 22d. In this configuration, each sunken pleat segment 26a, 26b has a triangular cross section in the axial direction x and the transverse direction y. Similarly, each sunken pleat 49 in the second plurality of sunken pleats 49 is bent inwardly in the transverse direction y from the second set of axially extending pleat tips 22b so as to form third, fourth and fifth sets of bend lines 22x, 22y, 22z extending in at least one angle to the axial direction x. Each sunken pleat 49 in the second plurality of sunken pleats 49 comprises sunken pleat segments 26a, 26b extending in the transverse direction y between the fifth bend line 22z and one of the third and fourth bend lines 22x, 22y. In this configuration, each sunken pleat segment 26a, 26b has a triangular cross section in the axial direction x and transverse direction y.

Still referring to FIGS. 20a and 20b, the pleated filter media 12 is folded to form the plurality of pleats 24 having pleat segments 26 extending in the axial direction x between the first and second axial ends 28a, 28b and extending in the transverse direction y between the first and second sets of pleat tips 30a, 30b, which are at least partially defined by the first and second sets of bend lines 22a, 22b, and such that the noted axial flow channels 32 are defined between the pleat segments 26 in the lateral direction z. The plurality of pleats 24 is formed so as to have a width in the transverse direction y that varies along the axial direction x at least along portions of the plurality of pleats 24. These portions include at least the noted first and second linear portions 34a, 37b extending at angles to the axial direction x. The sheet of filter media 46 is further folded to form the noted first plurality of sunken pleats 48 defining the first linear portion 34a along the first set of bend lines 30a and the noted second plurality of sunken pleats 49 defining the second linear portion 37b along the second set of bend lines 22b. In this manner, the first linear portion 34a extends along the first set of bend lines 22a and the second linear portion 37b extends along the second set of bend lines 22b. In this example, the first plurality of sunken pleats 48 and the second plurality of sunken pleats 49 both extend from the axial end 28a. The filter media 12 can further be formed by folding to achieve the above described pluralities of sunken pleats 48, 49 such that the noted third, fourth and fifth sets of bend lines 22c, 22d, 22e; 22x, 22y, 22z, respectively, extend in at least one angle to the axial direction x and define the sunken pleat segments 26a, 26b in the transverse direction y.

Further, in another example the outlet area E can be increased from what is shown in FIG. 20c to further reduce restriction. This can be accomplished by folding so as to increase the angle α and optionally also decrease the angle β.

Figure 21A:
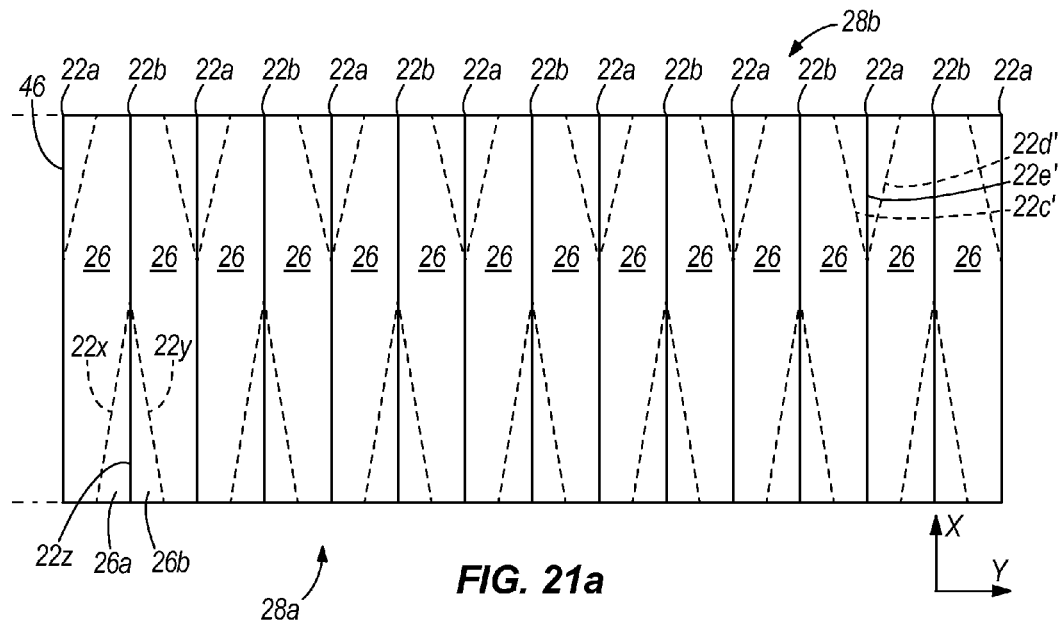
FIG. 21a is a top view of a filter media according to a fifth method for forming the filter media of the disclosure by folding the filter media along a plurality of bend lines.
Figure 21B:
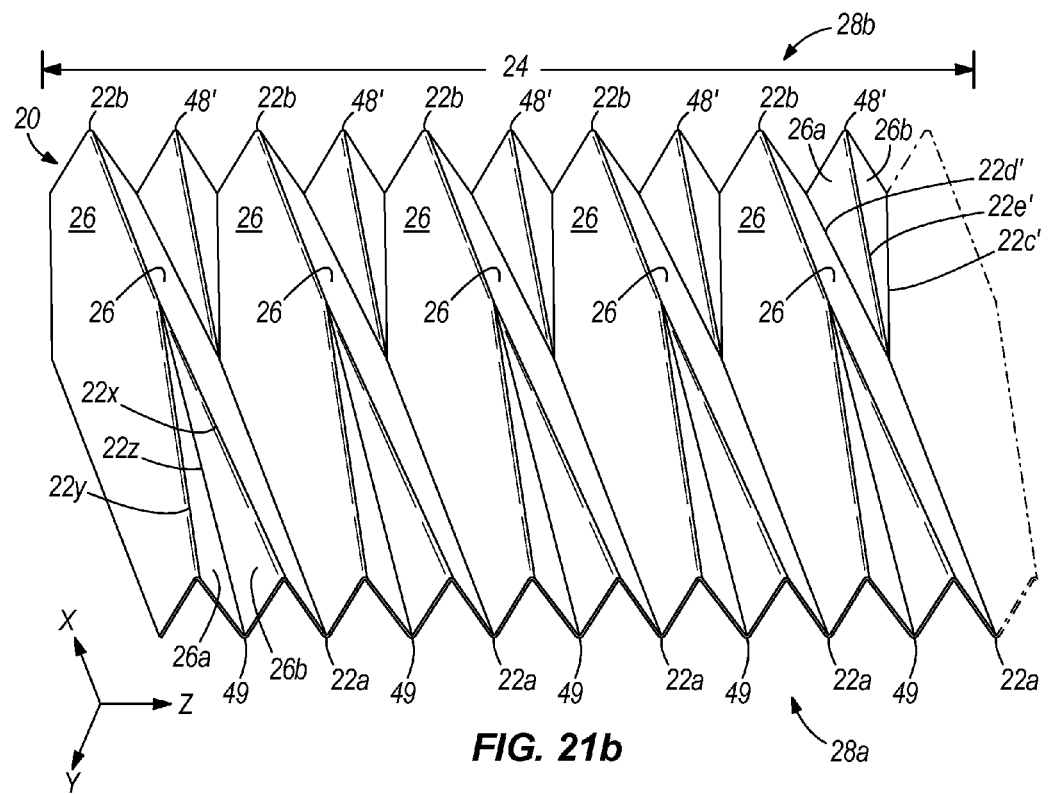
FIG. 21b is an isometric view of the filter media according to the fifth method for forming the filter media of the disclosure.
Figure 21C:
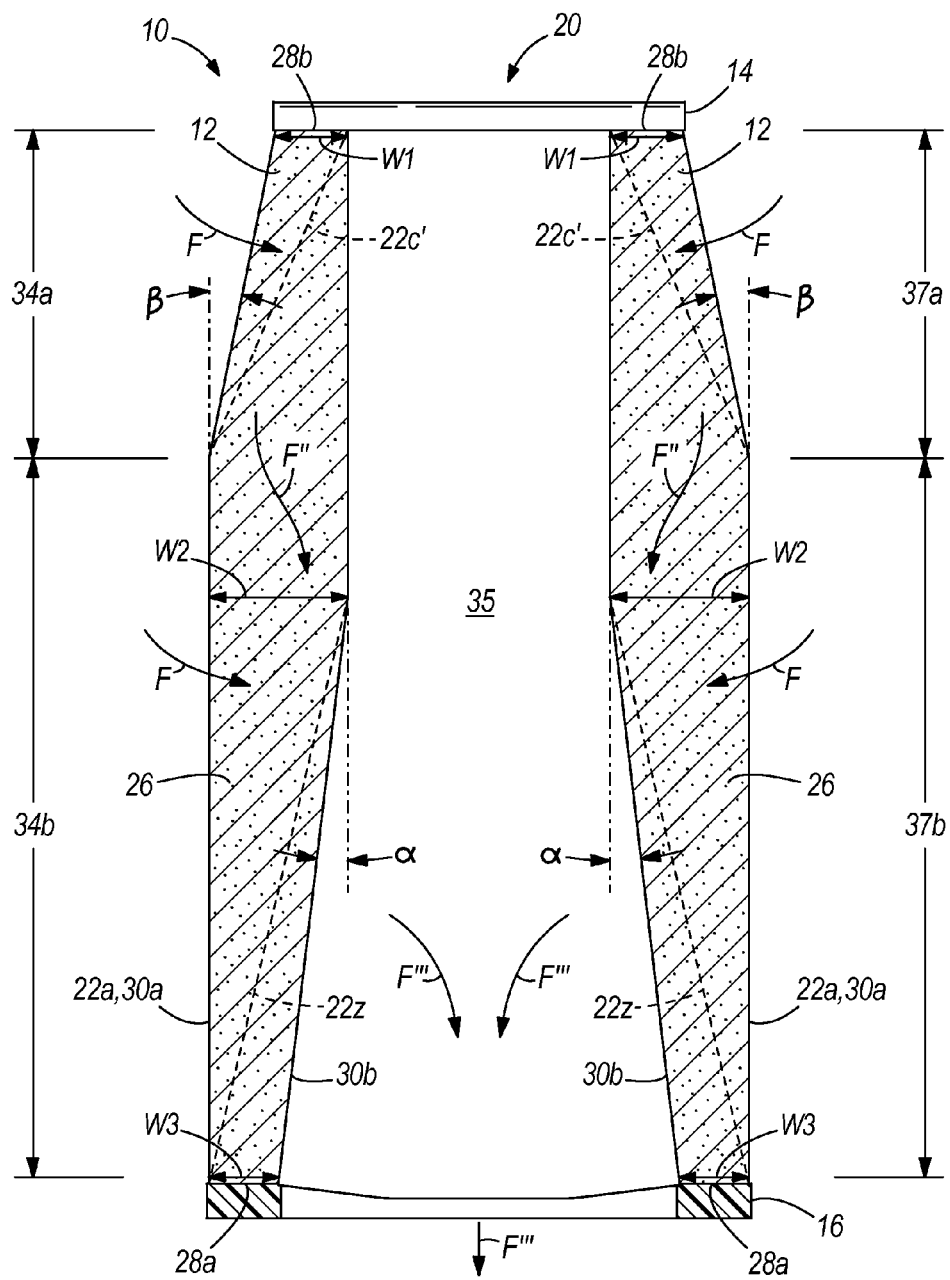
FIG. 21c is an end view of a filter having filter media formed according to the fifth method.

FIGS. 21a-21b show another such example. Referring first to FIG. 21c, cylindrical filter media 12 are shown in a filter 10 having opposing end caps 14, 16. Pleated filter media 12 has a first set of pleat tips 30a that extend at an angle β from the axial direction x along a linear portion 34a. Pleated filter media 12 also has a second set of pleat tips 30b that extend at an angle α from the axial direction x along a linear portion 37b. Pleated filter media 12 thus comprises linear portions 34a, 37b, respectively, that extend at different angles to the axial direction x. The first linear portion 34a extends along the first set of bend lines 22a and the second linear portion 37b extends along the second set of bend lines 22b. In this example, pleat depth ratio W2/W1 and W2/W3 can each range up to at least 2. Fluid can flow through the filter 10 as shown at arrows F; however, as with all examples herein, the direction and path of fluid flow may vary from that shown and described. For example, fluid can flow opposite of the direction shown at arrows F.

Referring to FIGS. 21a and 21b, the first linear portion 34a of the filter media 12 is defined by a first plurality of sunken pleats 48' extending along the first set of bend lines 22a. The second linear portion 37b is defined by a second plurality of sunken pleats 49 extending along the second set of bend lines 22b. The plurality of sunken pleats 48' extends from the second axial end 28a and the plurality of pleats 49 extends from the first axial end 28b.

Each sunken pleat in the first plurality of sunken pleats 48' is bent inwardly in the transverse direction y from the first set of pleat tips 22a so as to form third, fourth and fifth sets of bend lines 22c', 22d', 22e' extending in at least one angle to the axial direction x. Each sunken pleat 48' in the plurality of sunken pleats 48' has sunken pleat segments 26a, 26b extending in the transverse direction y between the noted fifth bend line 22e' and one of the third and fourth bend lines 22c', 22d'. In this configuration, each sunken pleat segment 26a, 26b has a triangular cross section in the axial direction x and the transverse direction y. Similarly, each sunken pleat 49 in the second plurality of pleats is bent inwardly in the transverse direction y from the second set of axially extending pleat tips 22b so as to form third, fourth and fifth sets of bend lines 22x, 22y, 22z extending in at least one angle to the axial direction x. Each sunken pleat 49 in the second plurality of sunken pleats 49 comprises sunken pleat segments 26a, 26b extending in the transverse direction y between the fifth bend line 22z and one of the third and fourth bend lines 22x, 22y. In this configuration, each sunken pleat segment 26a, 26b has a triangular cross section in the axial direction x and transverse direction y.

Still referring to FIGS. 21a and 21b, the pleated filter media 12 is formed by folding the media 12 to form the plurality of pleats 24 having pleat segments 26 extending in the axial direction x between the first and second axial ends 28a, 28b and extending in the transverse direction y between the first and second sets of pleat tips 30a, 30b which are at least partially defined by the first and second sets of bend lines 22a, 22b, and such that the noted axial flow channels 32 are defined between the pleat segments 26 in the lateral direction z. The plurality of pleats 24 is formed in so as to have a width in the transverse direction y that varies along the axial direction x at least along portions of the plurality of pleats 24. These portions can include at least the noted first and second linear portions 34a, 37b extending at angles to the axial direction x. The sheet of filter media 46 is folded to form the noted first plurality of sunken pleats 48' defining the first linear portion 34a along the first set of bend lines 30a. The sheet of filter media 46 is folded to form the noted second plurality of sunken pleats 49 defining the second linear portion 37b along the second set of bend lines 22b. In this manner, the first linear portion 34a extends along the first set of bend lines 22a and the second linear portion 37b extends along the second set of bend lines 22b. In this example, the first plurality of sunken pleats 48' and the second plurality of sunken pleats 49 each extend from opposite axial ends 28b, 28a, respectively. The filter media 12 can further be formed by folding to achieve the above pluralities of sunken pleats 48', 49 such that the noted third, fourth and fifth sets of bend lines 22c', 22d', 22e'; 22x, 22y, 22z, respectively, extend in at least one angle to the axial direction x and define sunken pleat segments 26a, 26b in the transverse direction y.

Figure 22A:
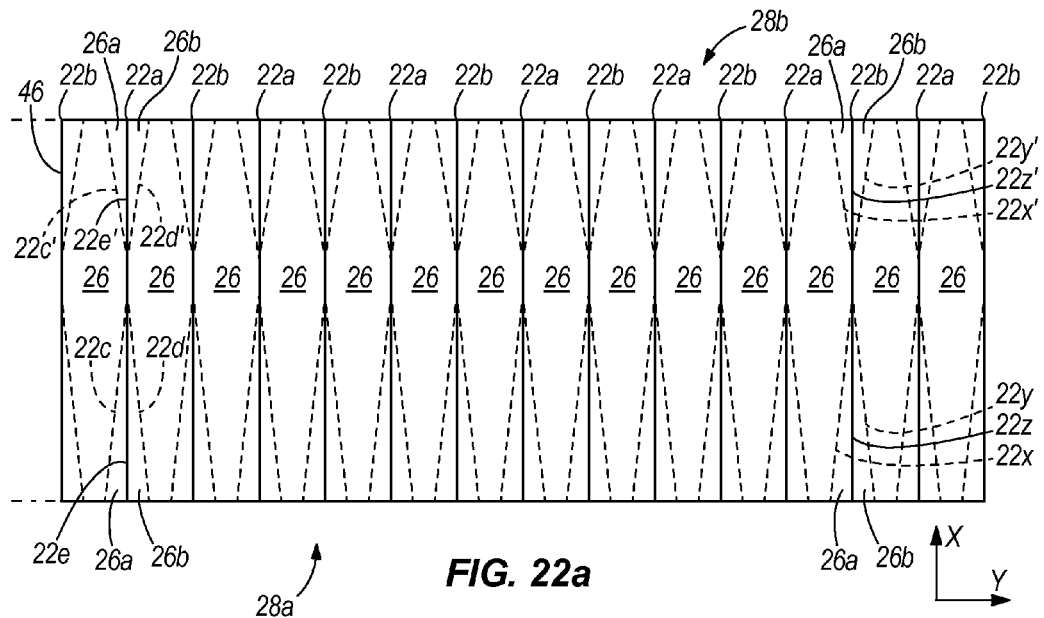
FIG. 22a is a top view of a filter media according to a sixth method for forming the filter media of the disclosure by folding the filter media along a plurality of bend lines.
Figure 22B:
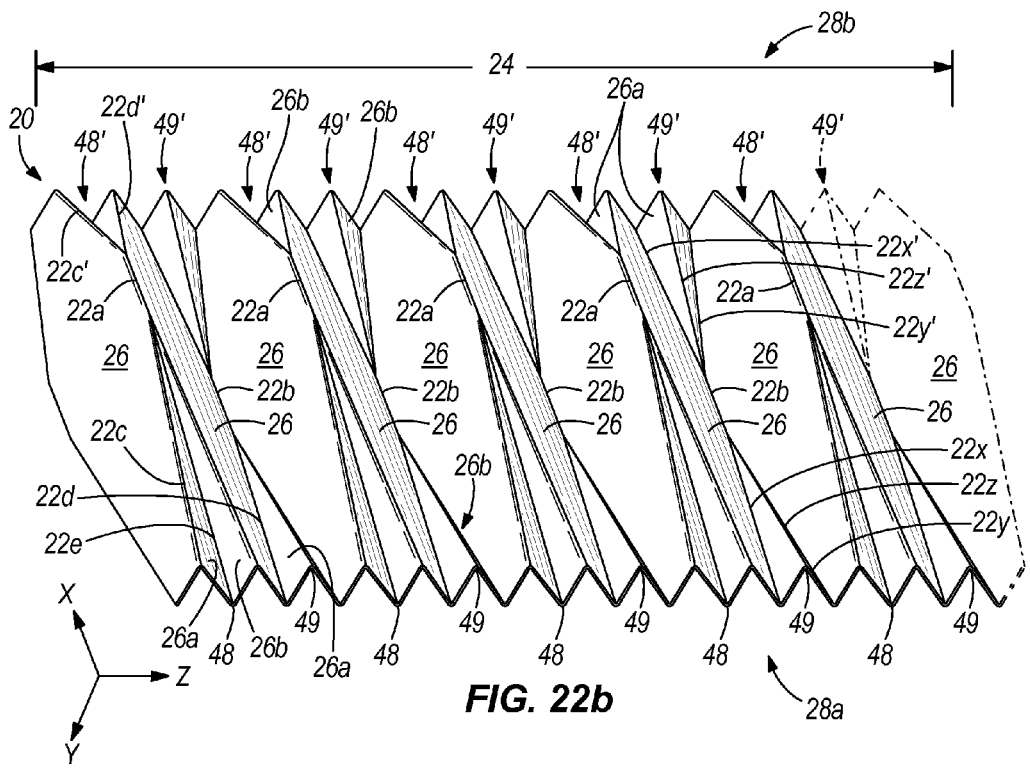
FIG. 22b is an isometric view of the filter media according to the sixth method for forming the filter media of the disclosure.
Figure 22C:
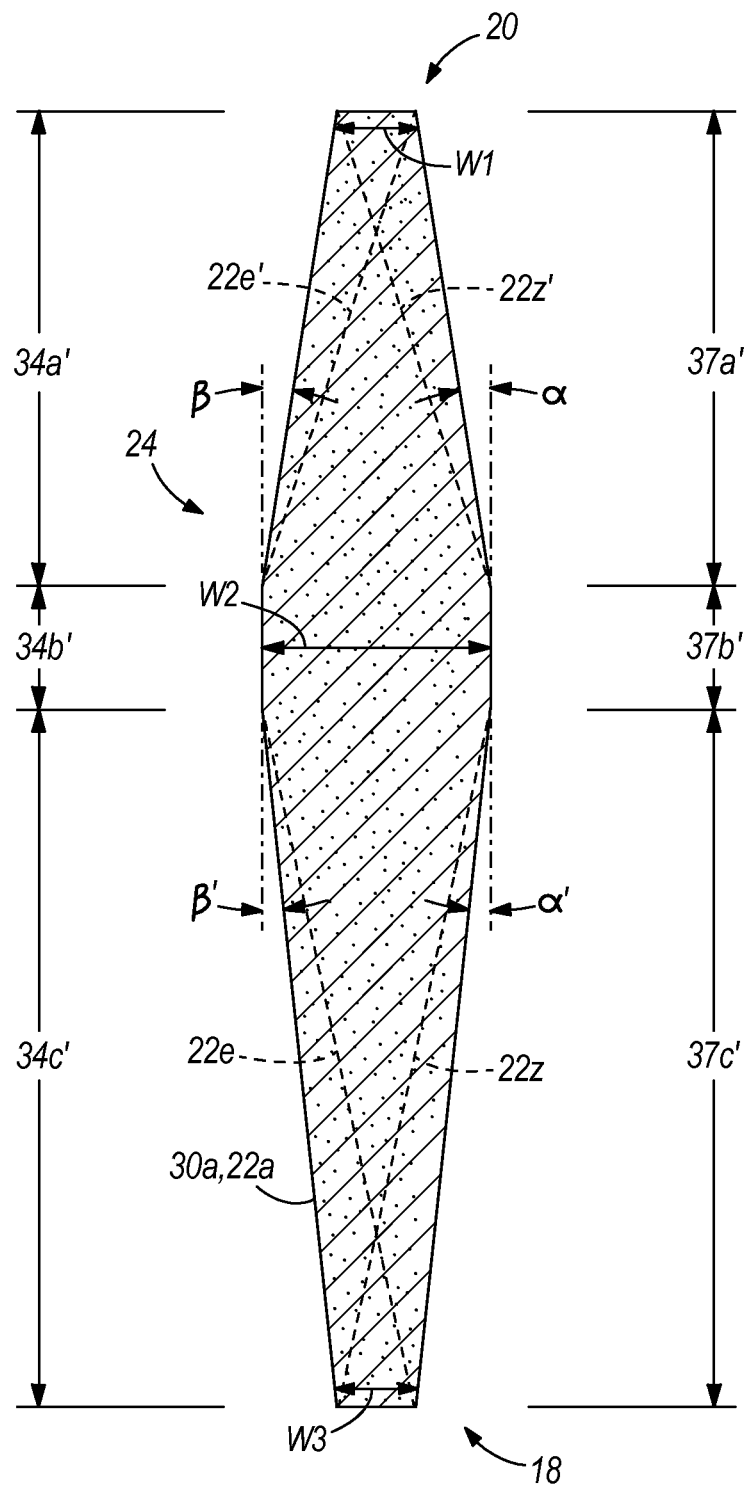
FIG. 22c is an end view of a filter having filter media formed according to the sixth method.

FIGS. 22a-22c show another such example. Referring to FIG. 22c, a pleated filter media 12 is shown. Pleated filter media 12 has a first set of pleat tips 30a that extend at angles β, β' from the axial direction x along a linear portion 34a' and a linear portion 34c', respectively. Pleated filter media 12 also has a second set of pleat tips 30b that extend at an angle α, α' from the axial direction x along a linear portion 37a' and along a linear portion 37c', respectively. The linear portions 34a' and 34c' extend along the first set of bend lines 22a and the linear portions 37a', 37c' extend along the second set of bend lines 22b. According to this example, pleat depth ratio W2/W1 and W2/W3 can each range up to at least 3. This example is useful, for example in a direct flow filter arrangement, such as is shown in FIGS. 2 and 3.

Referring now to FIGS. 22a and 22b, the linear portion 34a' is defined by a plurality of sunken pleats 48' extending along the first set of bend lines 22a from the second axial end 28b. The linear portion 34c' is defined by a plurality of sunken pleats 48 extending along the first set of bend lines 22a from the first axial end 28a. The linear portion 37a' is defined by a plurality of sunken pleats 49' extending along the second set of bend lines 22b at the second axial end 28b. The linear portion 37c' is defined by a plurality of sunken pleats 49 extending along the second set of bend lines 22b at the first axial end 28a. Each sunken pleat in the plurality of sunken pleats 48' is bent inwardly in the transverse direction y from the first set of pleat tips 22a so as to form third, fourth and fifth sets of bend lines 22c', 22d', 22e' extending in at least one angle to the axial direction x. Each sunken pleat 48' in the plurality of sunken pleats 48' has sunken pleat segments 26a, 26b extending in the transverse direction y between the noted fifth bend line 22e' and one of the third and fourth bend lines 22c', 22d'. In this configuration, each sunken pleat segment 26a, 26b has a triangular cross section in the axial direction x and the transverse direction y. Similarly, each sunken pleat 48 in the plurality of sunken pleats 48 is bent inwardly in the transverse direction y from the first set of pleat tips 22a so as to form third, fourth and fifth sets of bend lines 22c, 22d, 22e extending in at least one angle to the axial direction x. Each sunken pleat 48 in the plurality of sunken pleats 48 has sunken pleat segments 26a, 26b extending in the transverse direction y between the noted fifth bend line 22e and one of the third and fourth bend lines 22*c*, 22*d*. In this configuration, each sunken pleat segment 26*a*, 26*b* has a triangular cross section in the axial direction x and the transverse direction y.

Similarly, each sunken pleat 49' in the plurality of sunken pleats 49' is bent inwardly in the transverse direction y from the second set of axially extending pleat tips 22*b* so as to form third, fourth and fifth sets of bend lines 22*x'*, 22*y'* 22*z'* extending in at least one angle to the axial direction x. Each sunken pleat 49' in the plurality of sunken pleats 49' comprises sunken pleat segments 26*a*, 26*b* extending in the transverse direction y between the fifth bend line 22*z'* and one of the third and fourth bend lines 22*x'*, 22*y'*. In this configuration, each sunken pleat segment 26*a*, 26*b* has a triangular cross section in the axial direction x and transverse direction y. Each sunken pleat 49 in the second plurality of sunken pleats 49 is bent inwardly in the transverse direction y from the second set of axially extending pleat tips 22*b* so as to form third, fourth and fifth sets of bend lines 22*x*, 22*y*, 22*z* extending in at least one angle to the axial direction x. Each sunken pleat 49 in the plurality of sunken pleats 49 comprises sunken pleat segments 26*a*, 26*b* extending in the transverse direction y between the fifth bend line 22*z* and one of the third and fourth bend lines 22*x*, 22*y*. In this configuration, each sunken pleat segment 26*a*, 26*b* has a triangular cross section in the axial direction x and transverse direction y.

Referring still to FIGS. 22*a* and 22*b*, the pleated filter media 12 is formed by folding to form the plurality of pleats 24 having pleat segments 26 extending in the axial direction x between the first and second axial ends 28*a*, 28*b* and extending in the transverse direction y between the first and second sets of pleat tips 30*a*, 30*b*, which are at least partially defined by the first and second sets of bend lines 22*a*, 22*b*, and such that the noted axial flow channels 32 are defined between the pleat segments 26 in the lateral direction z. The plurality of pleats 24 is formed so as to have a width in the transverse direction y that varies along the axial direction x at least along portions of the plurality of pleats 24. These portions include at least the noted portions 34*a'*, 34*c'*, 37*a'*, 37*c'* extending at angles to the axial direction x. The sheet of filter media 46 is further folded to form the noted plurality of sunken pleats 48, 48' 49, 49'. In this manner, the linear portions 34*a'*, 34*c'* extend along the first set of bend lines 22*a* and the linear portions 37*a'*, 37*c'* extend along the second set of bend lines 22*b*. In this example, pluralities of sunken pleats 48, 49 extend from the first axial end 28*a* and the pluralities of sunken pleats 48', 49' extend from the second axial end 28*b*. The filter media 12 can further be formed by folding to achieve the above described pluralities of sunken pleats such that the noted third, fourth and fifth sets of bend lines extend in at least one angle to the axial direction x and define the sunken pleat segments 26*a*, 26*b* in the transverse direction y.

As discussed in reference to the embodiments herein above, the folding method advantageously creates a filter media 12 having reduced restriction at one or both of the inlet and outlet ends 18, 20 of the filter 10. Increased open area at the noted inlet end and/or outlet 18, 20 can be provided. Further, the plurality of pleats 24 can optionally, advantageously be completely sealed with a suitable agent, such as urethane, thus avoiding the relatively costly process of alternate sealing.

Figure 23:
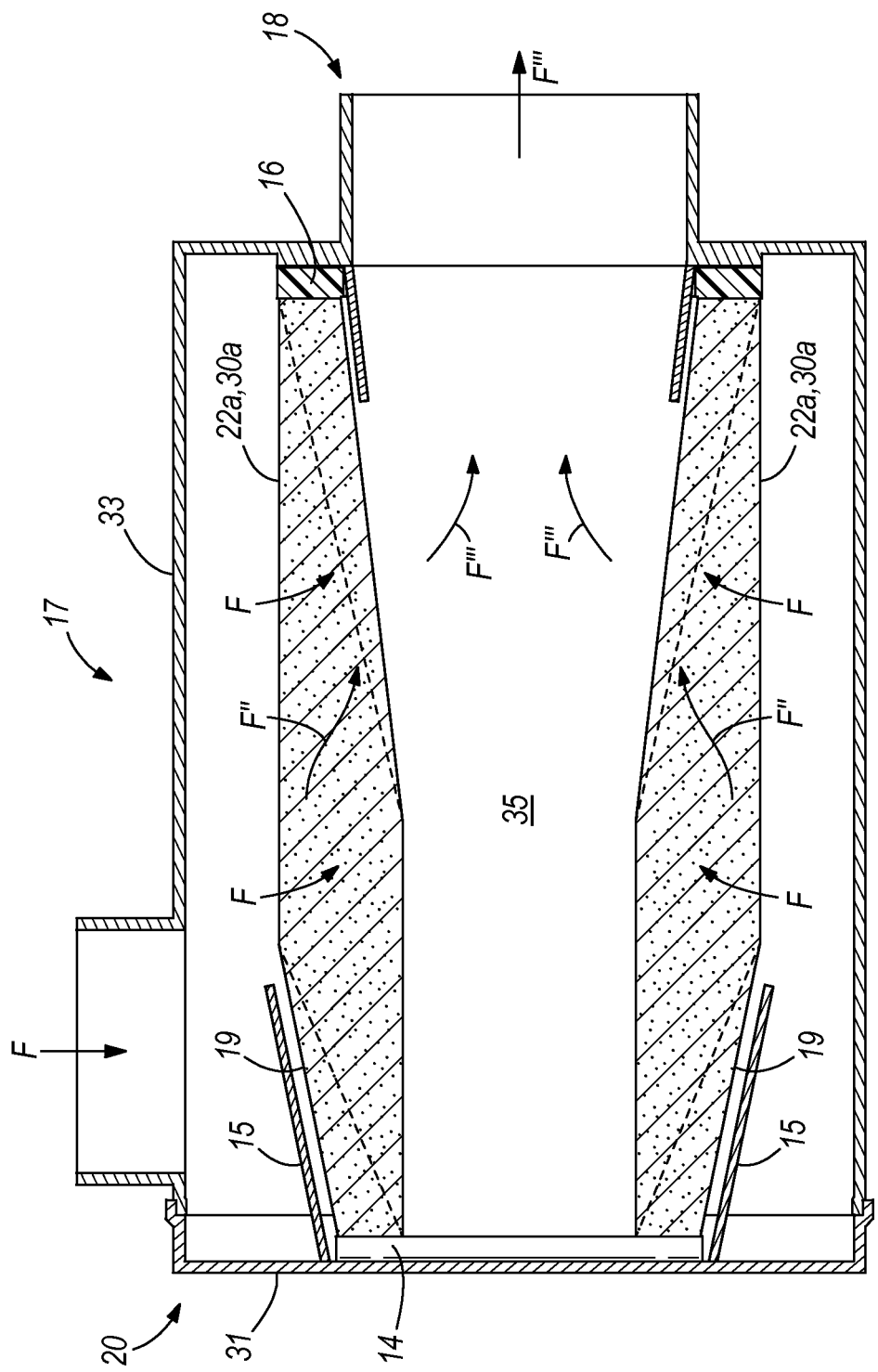
FIG. 23 is an end view of a filter having abutment surfaces abutting the pleated filter media along portions of the pleats having varying width.

FIG. 23 depicts a filter 10 having a housing 17 for retaining the filter 10 and its pleated filter media 12. The housing 17 has a removable cap 31 and a body 33. The housing 17 has abutment surfaces 15 that abut the pleated filter media 12 along a portion 19 of the plurality of pleats. Portion 19 can be formed by any one of the above described methods of forming a filter media 12 having a plurality of pleats 24 with a width in the transverse direction y that varies along the axial direction x at least along one or more portions of the plurality of pleats 24. The abutment surface 15 and the noted portion of the plurality of pleats 24 align together when a qualified filter element 12 is installed in the housing 17. This effectively prevents non-qualified filter media 12 having a different shape from being improperly installed.

What is claimed is:

1. A pleated filter media extending in an axial direction, a transverse direction that is perpendicular to the axial direction, and a lateral direction that is perpendicular to the axial direction and perpendicular to the transverse direction, the pleated filter media comprising:
    a plurality of pleats comprised of pleat segments extending in the axial direction between first and second axial ends and extending in the transverse direction between first and second sets of pleat tips which are at least partially defined by first and second sets of bend lines;
    wherein axial flow channels are defined between the pleat segments in the lateral direction;
    wherein the plurality of pleats has a width in the transverse direction that varies along the axial direction at least along a portion of the plurality of pleats; and
    wherein the portion of the plurality of pleats comprises at least a first linear portion extending at a first angle to the axial direction and a second linear portion extending at a second angle to the axial direction,
    wherein the first angle and the second angle are different.

2. A pleated filter media according to claim 1, wherein the first linear portion extends along the first set of bend lines and wherein the second linear portion extends along the second set of bend lines.

3. A pleated filter media according to claim 2, wherein the first linear portion is defined by a first plurality of sunken pleats along the first set of bend lines; and wherein the second linear portion is defined by a second plurality of sunken pleats along the second set of bend lines.

4. A pleated filter media according to claim 3, wherein the first plurality of sunken pleats extend from the first axial end and wherein the second plurality of sunken pleats extends from the first axial end.

5. A pleated filter media according to claim 3, wherein the first plurality of sunken pleats extend from the first axial end and wherein the second plurality of sunken pleats extends from the second axial end.

6. A pleated filter media according to claim 5, wherein the first and second axial ends have a width ratio in the transverse direction that ranges up to 3.

7. A pleated filter media according to claim 3, wherein each sunken pleat in the first plurality of sunken pleats is bent inwardly in the transverse direction from the first set of pleat tips so as to form third, fourth and fifth sets of bend lines extending in at least one angle to the axial direction.

8. A pleated filter media according to claim 7, wherein each sunken pleat in the first plurality of sunken pleats comprises sunken pleat segments extending in the transverse direction between the fifth bend line and one of the third and fourth bend lines.

9. A pleated filter media according to claim 8, wherein each sunken pleat segment has a triangular cross-section in the axial and transverse directions.

10. A pleated filter media according to claim 7, wherein each sunken pleat in the second plurality of sunken pleats is bent inwardly in the transverse direction from the second set of axially extending pleat tips so as to form third, fourth and fifth sets of bend lines extending in at least one angle to the axial direction.

11. A pleated filter media according to claim 10, wherein each sunken pleat in the second plurality of sunken pleats comprises sunken pleat segments extending in the transverse direction between the fifth bend line and one of the third and fourth bend lines.

12. A pleated filter media according to claim 11, wherein each sunken pleat segment has a triangular cross-section in the axial and transverse directions.

13. A pleated filter media according to claim 1, wherein the axial flow channels are completely sealed along at least one of the first and second axial ends.

14. A pleated filter media according to claim 3, wherein the portion of the plurality of pleats comprises at least a third linear portion extending at an angle to the axial direction and a fourth linear portion extending at an angle to the axial direction comprising a third plurality of sunken pleats along the first set of bend lines and a fourth plurality of sunken pleats along the second set of bend lines.

15. A method of forming a filter media extending in an axial direction, a transverse direction that is perpendicular to the axial direction, and a lateral direction that is perpendicular to the axial direction and perpendicular to the transverse direction, the method comprising:
folding a sheet of filter media to form a plurality of pleats comprised of pleat segments extending in the axial direction between first and second axial ends and extending in the transverse direction between first and second sets of pleat tips which are at least partially defined by first and second sets of bend lines;
wherein axial flow channels are defined between the pleat segments in the lateral direction;
wherein the plurality of pleats has a width in the transverse direction that varies along the axial direction at least along a portion of the plurality of pleats; and
wherein the portion of the plurality of pleats comprises at least a first linear portion extending at a first angle to the axial direction and a second linear portion extending at a second angle to the axial direction,
wherein the first angle and the second angle are different.

16. A method according to claim 15, comprising folding the sheet of filter media so that the first linear portion extends along the first let of bend lines and so that the second linear portion extends along the second set of bend lines.

17. A method according to claim 16, comprising:
folding the sheet of filter media to form a first plurality of sunken pleats defining the first linear portion along the first set of bend lines; and
folding the sheet of filter media to form a second plurality of sunken pleats defining the second linear portion along the second set of bend lines.

18. A method according to claim 17, comprising forming the first plurality of sunken pleats so as to extend from the first axial end and forming the second plurality of sunken pleats so as to extend from the second axial end.

19. A method according to claim 17, comprising forming the first plurality of sunken pleats so as to extend from the first axial end and comprising forming the second plurality of sunken pleats so as to extend from the first axial end.

20. A method according to claim 17, comprising forming each sunken pleat in the first plurality of sunken pleats so as to bend inwardly in the transverse direction from the first set of pleat tips so as to form third, fourth and fifth sets of bend lines extending in at least one angle to the axial direction.

21. A method according to claim 20, comprising forming each sunken pleat in the first plurality of sunken pleats so as to comprise sunken pleat segments extending in the transverse direction between the fifth bend line and one of the third and fourth bend lines.

22. A method according to claim 21, comprising forming each sunken pleat in the second plurality of sunken pleats so as to bend inwardly in the transverse direction from the second set of axially extending pleat tips so as to form third, fourth and fifth sets of bend lines extending in at least one angle to the axial direction.

23. A method according to claim 22, comprising forming each sunken pleat in the second plurality of sunken pleats so as to comprise sunken pleat segments extending in the transverse direction between the fifth bend line and one of the third and fourth bend lines.

24. A method according to claim 17, comprising folding the sheet of filter media to form a third linear portion extending at an angle to the axial direction and, a fourth linear portion extending at an angle to the axial direction, wherein a third plurality of sunken pleats defines the third linear portion along the first set of bend lines and wherein a fourth plurality of sunken pleats defines the fourth linear portion along the second set of bend lines.

25. A filter for filtering fluid, the filter extending in an axial direction, a transverse direction that is perpendicular to the axial direction and a lateral direction that is perpendicular to the axial direction and perpendicular to the transverse direction, the filter comprising:
a housing retaining a pleated filter media;
the pleated filter media comprising a plurality of pleats comprised of pleat segments extending in the axial direction between first and second axial ends and extending in the transverse direction between first and second sets of pleat tips which are at least partially defined by first and second sets of bend lines;
wherein axial flow channels are defined between the pleat segments in the lateral direction and wherein the plurality of pleats has a width in the transverse direction that varies along the axial direction;
wherein the width of the plurality of pleats in the transverse direction varies at least along a portion of the plurality of pleats;
a first abutment surface in said housing abuts said pleated filter media along said portion of the plurality of pleats; and
a first plurality of sunken pleats along the first set of bend lines,
wherein the first abutment surface in said housing abuts said first set of pleat tips along the first set of bend lines at the first plurality of sunken pleats, and wherein each sunken pleat in the first plurality of sunken pleats is bent inwardly in the transverse direction from the first set of pleat tips so as to form third, fourth and fifth sets of bend lines extending in at least one angle to the axial direction.

26. A filter according to claim 25, wherein the pleated filter media comprises a second plurality of sunken pleats along the second set of bend lines and comprising a second abutments surface in said housing abutting said second set of pleat tips along the second set of bend lines at the second plurality of sunken pleats.

27. A filter according to claim 26, wherein the first plurality of sunken pleats extend from the first axial end and wherein the second plurality of sunken pleats extends from the second axial end.

28. A filter according to claim 27, wherein the pleated filter media is one of a pair of pleated filter medias, each extending in the axial direction between first and second axial ends and extending in the transverse direction between first and second sets of pleat tips which are at least partially defined by first and second sets of bend lines, wherein axial flow channels are defined between the pleat segments in the lateral direction; and a first plurality of sunken pleats along the first set of bend lines;

wherein the pair of pleated filter medias are aligned with each other such that the respective pleat tips along the second set of bend lines abut each other.

29. A filter according to claim 25, wherein the first plurality of sunken pleats extend from the first axial end and wherein a second plurality of sunken pleats extends from the first axial end.

\* \* \* \* \*